(12) United States Patent　(10) Patent No.: US 8,310,107 B2
Jin　(45) Date of Patent: *Nov. 13, 2012

(54) POWER TRANSMISSION CONTROL DEVICE, POWER TRANSMITTING DEVICE, NON-CONTACT POWER TRANSMISSION SYSTEM, AND SECONDARY COIL POSITIONING METHOD

(75) Inventor: Mikimoto Jin, Chino (JP)

(73) Assignee: Seiko Epson Corporation, Tokyo (JP)

( * ) Notice: Subject to any disclaimer, the term of this patent is extended or adjusted under 35 U.S.C. 154(b) by 539 days.

This patent is subject to a terminal disclaimer.

(21) Appl. No.: 12/237,450

(22) Filed: Sep. 25, 2008

(65) Prior Publication Data

US 2009/0079271 A1　Mar. 26, 2009

(30) Foreign Application Priority Data

Sep. 26, 2007　(JP) ................................ 2007-249444

(51) Int. Cl.
*H01F 27/42* (2006.01)
*H03K 3/64* (2006.01)
(52) U.S. Cl. ....................................... 307/104; 320/108
(58) Field of Classification Search .................. 307/104; 320/108

See application file for complete search history.

(56) References Cited

U.S. PATENT DOCUMENTS

| | | | |
|---|---|---|---|
| 5,376,778 A | 12/1994 | Kreft | |
| 5,821,731 A | 10/1998 | Kuki et al. | |
| 5,850,135 A | 12/1998 | Kuki et al. | |
| 7,518,337 B2 | 4/2009 | Beart et al. | |
| 7,521,890 B2 * | 4/2009 | Lee et al. | 320/108 |
| 7,863,860 B2 * | 1/2011 | Lin | 320/108 |
| 2007/0126583 A1 | 6/2007 | Maniwa et al. | |
| 2007/0182367 A1 | 8/2007 | Partovi | |
| 2008/0245422 A1 | 10/2008 | McTargett | |
| 2009/0096415 A1 | 4/2009 | Beart et al. | |
| 2009/0127937 A1 | 5/2009 | Widmer et al. | |

FOREIGN PATENT DOCUMENTS

| | | |
|---|---|---|
| JP | A-6-4723 | 1/1994 |
| JP | A-08-033112 | 2/1996 |
| JP | A-9-182212 | 7/1997 |
| JP | A-9-215211 | 8/1997 |
| JP | A-2001-309579 | 11/2001 |
| JP | A-2002-101578 | 4/2002 |
| JP | A-2002-152997 | 5/2002 |
| JP | A-2003-284264 | 10/2003 |

(Continued)

OTHER PUBLICATIONS

U.S. Appl. No. 12/237,733; in the name of Mikimoto Jin, filed Sep. 25, 2008.

(Continued)

*Primary Examiner* — Michael Rutland Wallis
(74) *Attorney, Agent, or Firm* — Oliff & Berridge, PLC

(57) ABSTRACT

A power transmission control device used for a non-contact power transmission system includes a power-transmitting-side control circuit that controls power transmission to a power receiving device, and a harmonic detection circuit that detects a harmonic signal of a drive frequency of a primary coil. A resonant circuit (leakage inductance and resonant capacitor) that resonates with the harmonic of the drive frequency of the primary coil L1 is formed in the power receiving device so that harmonic resonance occurs. The harmonic detection circuit detects the harmonic resonance peak of the drive frequency of the primary coil.

11 Claims, 17 Drawing Sheets

FOREIGN PATENT DOCUMENTS

| | | |
|---|---|---|
| JP | A-2005-6440 | 1/2005 |
| JP | A-2005-6441 | 1/2005 |
| JP | A-2005-6460 | 1/2005 |
| JP | A-2006-500894 | 1/2006 |
| JP | A-2006-60909 | 3/2006 |
| JP | A-2006-320047 | 11/2006 |
| JP | A-2008-036101 | 2/2008 |

OTHER PUBLICATIONS

U.S. Appl. No. 12/236,192; in the name of Mikimoto Jin, filed Sep. 23, 2008.

U.S. Appl. No. 12/237,449; in the name of Mikimoto Jin, filed Sep. 25, 2008.

\* cited by examiner

FIG. 6A    FIG. 6B    FIG. 6C    FIG. 6D
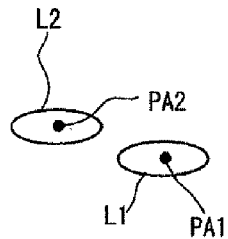
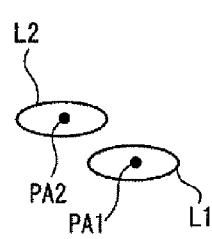
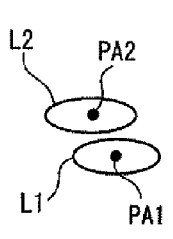
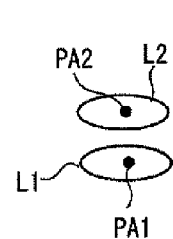
FIG. 7
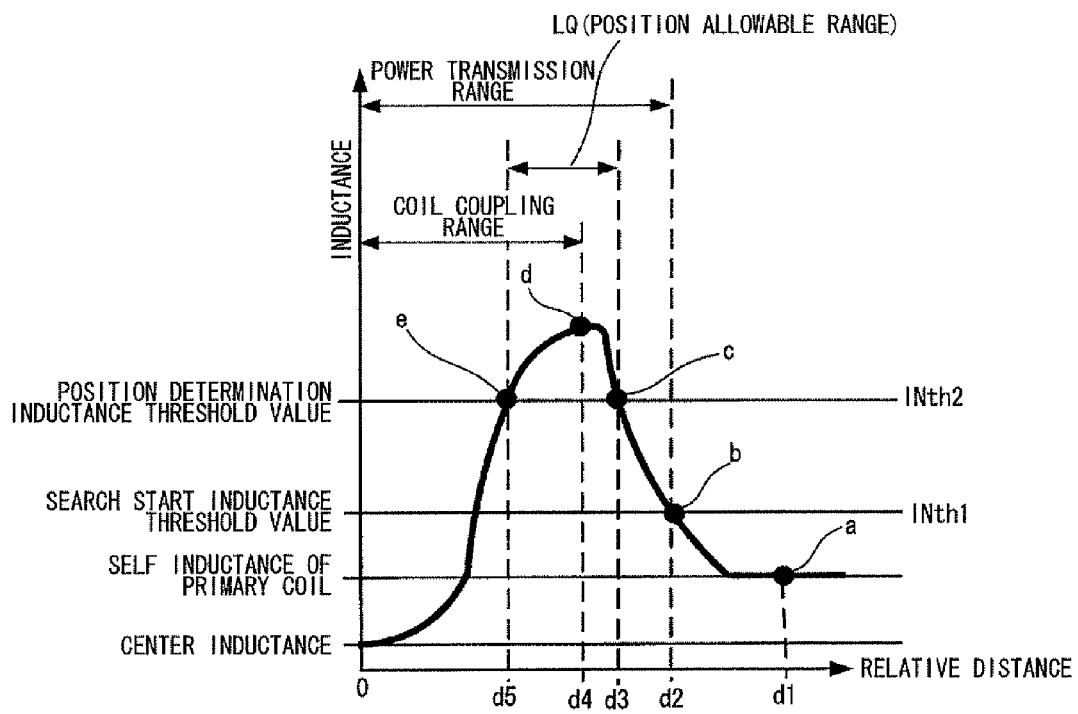

FIG. 9E                                   FIG. 9D $$fs = 5fd = 1/2\pi\sqrt{(LQ+LT) \cdot C2}$$

US 8,310,107 B2

POWER TRANSMISSION CONTROL DEVICE, POWER TRANSMITTING DEVICE, NON-CONTACT POWER TRANSMISSION SYSTEM, AND SECONDARY COIL POSITIONING METHOD

Japanese Patent Application No. 2007-249444 filed on Sep. 26, 2007, is hereby incorporated by reference in its entirety.

BACKGROUND

The present invention relates to a power transmission control device, a power transmitting device, a non-contact power transmission system, a secondary coil positioning method, and the like.

In recent years, non-contact power transmission (contactless power transmission) that utilizes electromagnetic induction to enable power transmission without metal-to-metal contact has attracted attention. As application examples of non-contact power transmission, charging a portable telephone, charging a household appliance (e.g., cordless telephone handset or watch), and the like have been proposed.

JP-A-2006-60909 discloses a non-contact power transmission device using a primary coil and a secondary coil, for example.

JP-A-2005-6460 discloses technology that detects misalignment of a primary coil and a secondary coil in a non-contact power transmission system. According to the technology disclosed in JP-A-2005-6460, whether or not the relative positional relationship between the primary coil and the secondary coil is correct is detected based on an output voltage of a rectifier circuit of a power receiving device. When the relative positional relationship between the primary coil and the secondary coil is correct, a light-emitting diode (LED) is turned ON to notify the user that the relative positional relationship between the primary coil and the secondary coil is correct.

According to the technology disclosed in JP-A-2005-6460, the user can be notified whether or not the primary coil and the secondary coil are accurately positioned. However, since occurrence of mispositioning is determined based on the output from the rectifier circuit of the power receiving device, power must be continuously transmitted from the power transmitting device to the power receiving device. Moreover, the power transmitting device cannot voluntarily acquire coil misalignment information.

SUMMARY

According to one aspect of the invention, there is provided a power transmission control device that controls a power transmitting device of a non-contact power transmission system, the non-contact power transmission system transmitting power from the power transmitting device to a power receiving device via non-contact power transmission through a primary coil and a secondary coil that are electromagnetically coupled, the power transmission control device comprising:

a power-transmitting-side control circuit that controls power transmission of the power transmitting device to the power receiving device; and a harmonic detection circuit that detects a harmonic signal of a drive signal of the primary coil.

According to another aspect of the invention, there is provided a power transmitting device comprising:

the above power transmission control device; and a primary coil.

According to another aspect of the invention, there is provided a non-contact power transmission system comprising:

the above power transmitting device; and a power receiving device that includes a resonant circuit, the resonant circuit resonating with a harmonic of the drive signal of a primary coil.

According to another aspect of the invention, there is provided a secondary coil positioning method for a non-contact power transmission system that transmits power from a power transmitting device to a power receiving device via non-contact power transmission through a primary coil and a secondary coil that are electromagnetically coupled, a capacitor being connected to the secondary coil, and a resonant circuit that resonates with a harmonic of a drive frequency of the primary coil being formed by a leakage inductance and the capacitor when the primary coil and the secondary coil are electromagnetically coupled in a state in which the center of the primary coil coincides with the center of the secondary coil, the method comprising:

providing a harmonic detection circuit and a notification section in the power transmitting device, the harmonic detection circuit detecting a harmonic signal of a drive frequency of the primary coil provided in the power transmitting device, and the notification section indicating a detection result for the relative positional relationship between the primary coil and the secondary coil based on a detection output from the harmonic detection circuit; and moving the position of the power receiving device using notification information from the notification section as an index to position the secondary coil with respect to the primary coil.

BRIEF DESCRIPTION OF THE DRAWINGS

FIGS. 6A to 6D are views showing examples of the relative positional relationship between a primary coil and a secondary coil.

FIG. 7 is a view showing the relationship between the relative distance between a primary coil and a secondary coil and the inductance of the primary coil.

FIGS. 9A to 9E are views illustrative of the configuration and the operation of a harmonic resonant circuit.

DESCRIPTION OF EXEMPLARY EMBODIMENTS

Figure 1A:
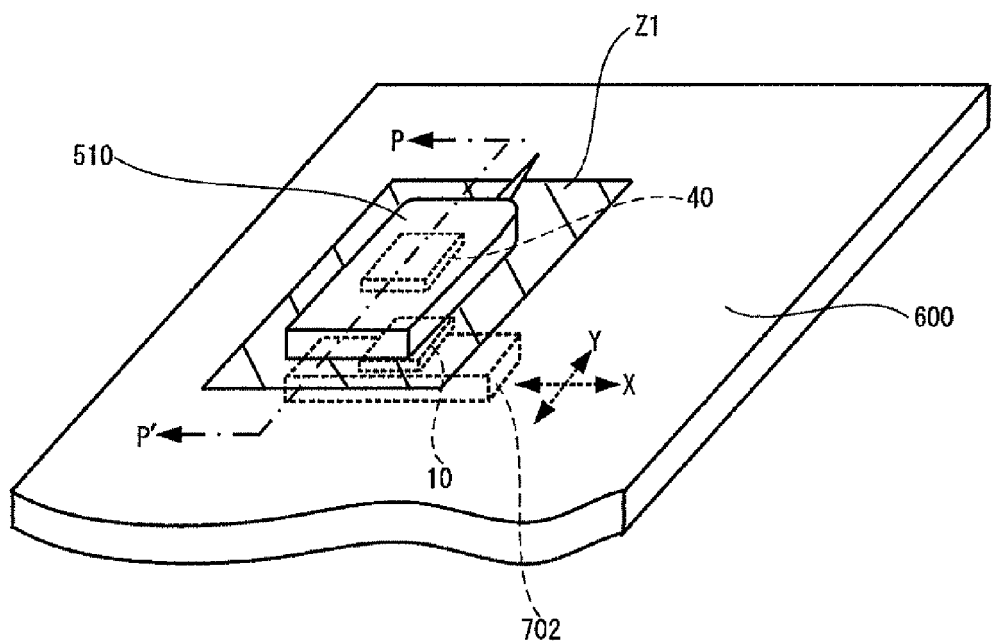
FIGS. 1A and 1B are views showing an example of an application of a non-contact power transmission system utilizing the invention.

Several embodiments of the invention may enable a power transmitting device (primary-side instrument) to voluntarily and accurately detect the relative positional relationship between the power transmitting device (primary-side instrument) and a power receiving device (secondary-side instrument).

(1) According to one embodiment of the invention, there is provided a power transmission control device that controls a power transmitting device of a non-contact power transmission system, the non-contact power transmission system transmitting power from the power transmitting device to a power receiving device via non-contact power transmission through a primary coil and a secondary coil that are electromagnetically coupled, the power transmission control device comprising:

a power-transmitting-side control circuit that controls power transmission of the power transmitting device to the power receiving device; and a harmonic detection circuit that detects a harmonic signal of a drive signal (drive frequency) of the primary coil.

According to this embodiment, the harmonic detection circuit provided in the power transmission control device detects the harmonic resonance peak of the drive frequency of the primary coil. For example, a resonant circuit that resonates with the harmonic of the drive frequency of the primary coil is formed in the secondary-side instrument (power receiving device side).

For example, the secondary-side resonant circuit is formed when the primary coil and the secondary coil have a given relative positional relationship so that the resonance peak occurs. For example, a situation in which the primary coil and the secondary coil have a given relative positional relationship can be accurately detected irrespective of the operation of the secondary-side instrument (i.e., the primary-side instrument can voluntarily detect the situation) by intermittently driving the primary coil and monitoring the detection output level of the harmonic detection circuit.

For example, when the resonance frequency of the primary-side resonant circuit including the primary coil is referred to as fp, the drive frequency of the primary coil is generally set at a frequency (fd) away from the resonance frequency (fp) taking the operational stability into consideration.

When the drive signal of the primary coil is a symmetrical alternating-current signal, the harmonic (fs) of the drive frequency of the primary coil is only an odd-order harmonic. For example, the fifth-order harmonic (fs=5fd) may be used to detect the positional relationship between the primary coil (power transmitting device) and the secondary coil (power receiving device or secondary-side instrument).

Since the harmonic signal has a frequency that is not involved in normal power transmission from the primary coil to the secondary coil, the harmonic signal does not affect the normal operation. Moreover, since the resonance energy is reduced to about 1/nth of the basic frequency when using an nth-order (n is an odd number equal to or larger than three, for example) harmonic, the resonance peak value has an appropriate level so that the harmonic resonance peak can be easily detected by the harmonic detection circuit.

The detection output of the harmonic detection circuit may be used to detect the positions of the primary coil (power transmitting device) and the secondary coil (power receiving device or secondary-side instrument) in a broad sense. The detection output may be utilized for various applications. For example, the primary coil and the secondary coil may be positioned using the detection output of the harmonic detection circuit as an index.

A situation in which the secondary-side instrument has been placed at a given position can be detected utilizing the harmonic detection output (secondary-side instrument placement detection).

A situation in which the primary coil or the secondary coil moves away (or approaches) can be detected in real time by monitoring a change in the level of the harmonic detection output (detection of movement, approach, leave, or the like).

A situation in which the secondary-side instrument has been removed can be detected when the harmonic detection output at a given level has not been obtained (leave detection).

When the harmonic can be detected, it can be determined that the article placed in the placement area is not a screw, a nail, or the like, but is a secondary-side instrument that can be (may be) a power transmission target. Specifically, the harmonic detection circuit also has a function of a means that detects whether or not the article placed in the placement area is an instrument that can be a power transmission target (i.e., a detector that detects whether or not the article is an appropriate secondary-side instrument).

(2) In the power transmission control device, a resonant circuit may be formed in the power receiving device, the resonant circuit resonating with a harmonic of the drive signal of the primary coil; and the harmonic detection circuit may detect a harmonic resonance signal of the resonant circuit.

According to this embodiment, the resonant circuit that resonates with the harmonic of the drive frequency of the primary coil is formed in the power receiving device so that the harmonic resonance peak is obtained. The resonant circuit may be implemented by setting the capacitance of the resonant capacitor connected to the secondary coil to resonate with a leakage inductance when the primary coil and the secondary coil are positioned at a given distance R (R≧0), for example.

(3) In the power transmission control device, the power receiving device may include a capacitor connected to the secondary coil;

a resonant circuit may be formed by a leakage inductance and the capacitor when the primary coil and the secondary coil are electromagnetically coupled in a state in which the center of the primary coil coincides with the center of the secondary coil, the resonant circuit resonating with a harmonic of the drive signal of the primary coil; and the harmonic detection circuit may operate as a position detection circuit that detects that a position of the primary coil coincides with a position of the secondary coil.

According to this embodiment, the resonant circuit is formed by the capacitor and the leakage inductance when the position of the primary coil coincides with the position of the secondary coil. Therefore, the detection output from the harmonic detection circuit can be utilized as a position detection signal that indicates that the position of the primary coil coincides with the position of the secondary coil. Therefore, the primary coil and the secondary coil can be positioned using the level of the harmonic detection output as the position detection signal as an index.

For example, an indicator lamp provided in the primary-side instrument is turned ON when a harmonic detection output that exceeds a given level is obtained. The user manually moves the secondary-side instrument by trial and error to search for a position at which the lamp is turned ON, for example. This enables the secondary coil to be positioned with respect to the primary coil.

(4) In the power transmission control device,
the power receiving device may include a capacitor connected to the secondary coil;
a resonant circuit may be formed by a leakage inductance and the capacitor when the primary coil and the secondary coil are electromagnetically coupled in a state in which the center of the primary coil and the center of the secondary coil are positioned at a given distance, the resonant circuit resonating with a harmonic of the drive signal of the primary coil; and the harmonic detection circuit may operate as a position detection circuit that detects that the primary coil and the secondary coil are positioned at the given distance.

According to this embodiment, the resonant circuit is formed by the capacitor and the leakage inductance when the primary coil and the secondary coil are positioned at the given distance. Therefore, the detection output from the harmonic detection circuit can be utilized as a position detection signal that indicates that the primary coil and the secondary coil are positioned at the given distance.

Therefore, a given relative positional relationship between the primary coil and the secondary coil may be detected, or the primary coil and the secondary coil can be set to have the given relative positional relationship using the level of the harmonic detection output as the position detection signal as an index.

(5) The power transmission control device may further comprise:
an actuator control circuit that controls the operation of an actuator, the actuator moving a position of the primary coil in an XY plane, and
the primary coil may be moved by causing the actuator control circuit to drive the actuator using a detection output from the harmonic detection circuit as an index to position the primary coil with the secondary coil.

According to this embodiment, the position of the primary coil is moved by trial and error using the actuator until a harmonic detection output equal to or higher than a given level is obtained, for example. This automatically implements a given relative positional relationship between the primary coil and the secondary coil.

The primary coil may be moved by trial and error by moving the primary coil based on a given movement sequence (e.g., based on a spiral scan sequence), or moving the primary coil at random, for example.

(6) The power transmission control device may further comprise:
an approach detection circuit that detects the approach of the secondary coil based on a coil end voltage or a coil current of the primary coil.

According to this configuration, the approach of the secondary coil (to the primary coil) can be automatically detected while detecting the relative positional relationship between the primary coil and the secondary coil based on the harmonic detection output. Therefore, the relative positional relationship between the primary coil and the secondary coil can be automatically detected using detection of the approach of the secondary coil as a trigger, for example, whereby the convenience of the non-contact power transmission system is improved.

When the approach of the secondary coil can be detected, it can be determined that the secondary-side instrument that can be a power transmission target has approached. Therefore, the approach detection circuit also has a function of a means that detects whether or not the instrument placed in the placement area is a secondary-side instrument that includes the secondary coil and can be a power transmission target (i.e., a detector that detects whether or not the instrument is an appropriate secondary-side instrument).

(7) In the power transmission control device,
the secondary coil may be a secondary coil provided with a magnetic material, and
the approach detection circuit may detect the approach of the secondary coil by detecting a decrease of the coil end voltage or the coil current when driving the primary coil at a given frequency, the decrease being caused by an increase of inductance of the primary coil with the approach of the secondary coil provided with the magnetic material.

This embodiment provides an example of a specific secondary coil approach detection method. The secondary coil is a coil provided with a magnetic material. The magnetic material is a shield that separates a magnetic flux of the secondary coil from a secondary-side circuit, or may be a core of the secondary coil, for example.

When the secondary coil has approached the primary coil, a magnetic flux of the primary coil passes through the magnetic material of the secondary coil. As a result, the inductance of the primary coil increases. The term "inductance" used herein refers to an inductance (more accurately an apparent inductance) that changes due to the approach of the secondary coil provided with the magnetic material. The term "apparent inductance" is distinguished from the inductance (self-inductance) of the primary coil (i.e., the inductance of the primary coil when the primary coil is not affected by the secondary coil). The value of the apparent inductance is obtained by measuring the inductance of the primary coil when the secondary coil has approached the primary coil using a measuring instrument, for example.

In this specification, the term "apparent inductance" is merely written as "inductance", except for the case where clear statement of the term "apparent inductance" is considered to be necessary. Since the coil end voltage (coil current) of the primary coil decreases due to an increase in the inductance of the primary coil, the approach of the primary coil can be detected by detecting the change in the coil end voltage (coil current).

(8) In the power transmission control device,
the power-transmitting-side control circuit may intermittently drive the primary coil at a given frequency in order to detect the approach of the secondary coil.

The primary coil is intermittently (e.g., cyclically) driven at a given frequency in order to automatically detect the approach of the secondary coil. In this case, the approach of the secondary coil is detected when a decrease in the coil end voltage (coil current) has been detected.

(9) The power transmission control device may further comprise:

notification section that indicates a detection result of the relative positional relationship between the primary coil and the secondary coil based on a is detection output from the harmonic detection circuit.

According to this embodiment, the notification section notifies the user of the detection result for the relative positional relationship between the primary coil and the secondary coil by appealing to the senses (e.g., sight or hearing) of the user. This enables the user to determine of the positional relationship between the primary coil and the secondary coil.

Moreover, placement or removal (leave) of the secondary-side instrument can also be detected. The notification section may notify the user whether or not the secondary-side instrument is an instrument that can be a power transmission target (e.g., a secondary-side instrument having a secondary-side configuration compliant with the standard).

Notification may be implemented in various ways. For example, a multi-stage notification operation may be performed corresponding to the level of the harmonic detection output as a coil relative positional relationship detection signal.

For example, a red indicator lamp may be turned ON when a harmonic detection output that exceeds a first level is obtained, and a green indicator lamp may be turned ON when a harmonic detection output that exceeds a second level higher than the first level is obtained. If the user manually moves the secondary-side instrument by trial and error and checks whether or not the lamp is turned ON and the color of the lamp, the secondary coil can be more efficiently positioned with respect to the primary coil.

Specifically, since the secondary coil has approached the primary coil to some extent when the red lamp is turned ON, the user can more carefully move the secondary-side instrument within a narrow search (movement) range. This enables the secondary coil to be easily positioned with respect to the primary coil.

In addition, positioning is further facilitated by forming a transparent placement area so that the user can visually observe the position of the coil provided under the placement area either directly or indirectly, for example.

(10) According to another embodiment of the invention, there is provided a power transmitting device comprising:

one of the above power transmission control devices; and a primary coil.

This implements a novel power transmitting device for a novel non-contact power transmission system that has a function of voluntarily detecting the positional relationship between the primary coil and the secondary coil.

(11) According to another embodiment of the invention, there is provided a non-contact power transmission system comprising:

the above power transmitting device; and a power receiving device that includes a resonant circuit, the resonant circuit resonating with a harmonic of the drive signal of a primary coil.

This automatically implements a novel non-contact power transmission system that can detect the positional relationship between the primary coil and the secondary coil using the harmonic detection circuit provided in the primary-side instrument.

(12) According to another embodiment of the invention, there is provided a secondary coil positioning method for a non-contact power transmission system that transmits power from a power transmitting device to a power receiving device via non-contact power transmission through a primary coil and a secondary coil that are electromagnetically coupled, a capacitor being connected to the secondary coil, and a resonant circuit that resonates with a harmonic of a drive frequency of the primary coil being formed by a leakage inductance and the capacitor when the primary coil and the secondary coil are electromagnetically coupled in a state in which the center of the primary coil coincides with the center of the secondary coil, the method comprising:

providing a harmonic detection circuit and a notification section in the power transmitting device, the harmonic detection circuit detecting a harmonic signal of a drive frequency of the primary coil provided in the power transmitting device, and the notification section indicating a detection result for the relative positional relationship between the primary coil and the secondary coil based on a detection output from the harmonic detection circuit; and moving the position of the power receiving device using notification information from the notification section as an index to position the secondary coil with respect to the primary coil.

According to this embodiment, an indicator lamp is turned ON when a harmonic detection output that exceeds a given level is obtained, for example. The user manually moves the secondary-side instrument by trial and error to search for a position at which the lamp is turned ON so that the secondary coil can be positioned with respect to the primary coil.

Preferred embodiments of the invention are described below with reference to the drawings. Note that the following embodiments do not in any way limit the scope of the invention defined by the claims laid out herein. Note that all elements of the following embodiments should not necessarily be taken as essential requirements for the invention.

The principle of detecting the relative positional relationship between a primary coil and a secondary coil using harmonic detection is described below with reference to an example in which the position of the primary coil is automatically moved using the output from a harmonic detection circuit. Various variations utilizing the harmonic detection output (e.g., a configuration that notifies the user of the detected positional relationship between the primary coil and the secondary coil, and an example in which a secondary-side instrument is moved manually) are described thereafter.

First Embodiment

An application example of a non-contact power transmission system utilizing the invention is given below.

Application Example of Non-Contact Power Transmission System

Figure 1B:
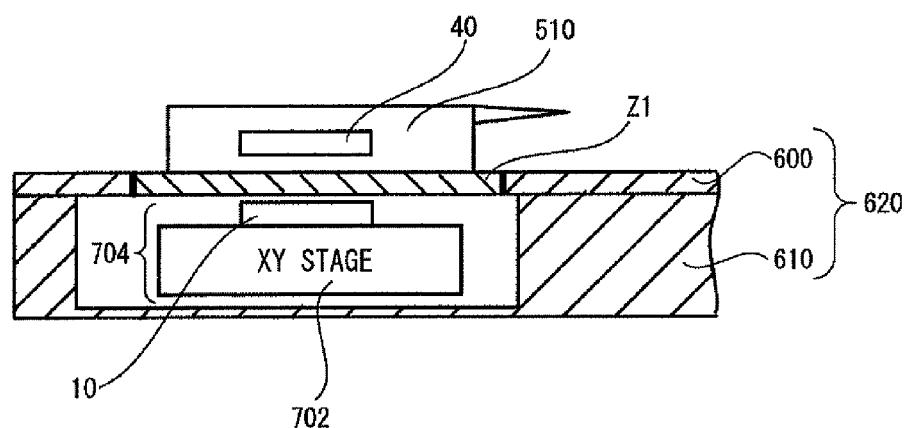

FIGS. 1A and 1B are views showing an example of an application of a non-contact power transmission system utilizing the invention. FIG. 1A is a perspective view showing a system desk, and FIG. 1B is a cross-sectional view of the system desk shown in FIG. 1A along the line P-P'.

As shown in FIG. 1B, a power-transmitting-side device (i.e., a primary-side structure including a power transmitting device 10 according to the invention, an actuator (not shown), and an XY stage 702) 704 is provided in a structure (system desk in this example) 620 having a flat surface.

Specifically, the power-transmitting-side device 704 is placed in a depression formed in the system desk 620. A flat plate (flat member; e.g., an acrylic plate having a thickness of several millimeters) 600 is provided over (on the upper side of) the system desk 620. The flat plate 600 is supported by a support member 610.

The flat plate 600 includes a portable terminal placement area Z1 in which a portable terminal (such as a portable telephone terminal, a PDA terminal, and a portable computer terminal) is placed.

As shown in FIG. 1A, the portable terminal placement area (placement area) Z1 included in the flat plate 600 differs in color from the remaining area so that the user can determine that the portable terminal placement area Z1 is an area in which a portable terminal should be placed. Note that the color of the boundary area between the portable terminal placement area (placement area) Z1 and the remaining area may be changed instead of changing the color of the entire portable terminal placement area Z1.

The placement area Z1 may be formed using a transparent member, and the area other than the placement area Z1 may be formed using an opaque member. In this case, since the user can determine the placement area and visually observe the lower side (inside) of the placement area, the user can easily determine the position of a primary coil provided under the placement area either directly or indirectly. Therefore, when the user moves the position of a secondary-side instrument to position a primary coil and a secondary coil, the user can more easily position the primary coil and the secondary coil so that the convenience to the user is improved.

A portable terminal (secondary-side instrument) 510 includes a power receiving device 40 (including a secondary coil) that receives power transmitted from the power transmitting device 10.

When the portable terminal 510 has been placed at an approximate position in the portable terminal placement area Z1, the power transmitting device 10 provided in the system desk 620 automatically detects that the portable terminal 510 has been placed in the portable terminal placement area Z1, and moves the XY stage (movable stage) by driving the actuator (not shown in FIG. 1) to automatically adjust the position of the primary coil corresponding to the position of the secondary coil. The above-described primary coil position automatic adjustment function enables non-contact power transmission to be performed while optimizing the positional relationship between the primary coil and the secondary coil regardless of the manufacturer, type, size, shape, design, and the like of the portable terminal.

Configuration and Operation of Non-Contact Power Transmission System

Figure 2:
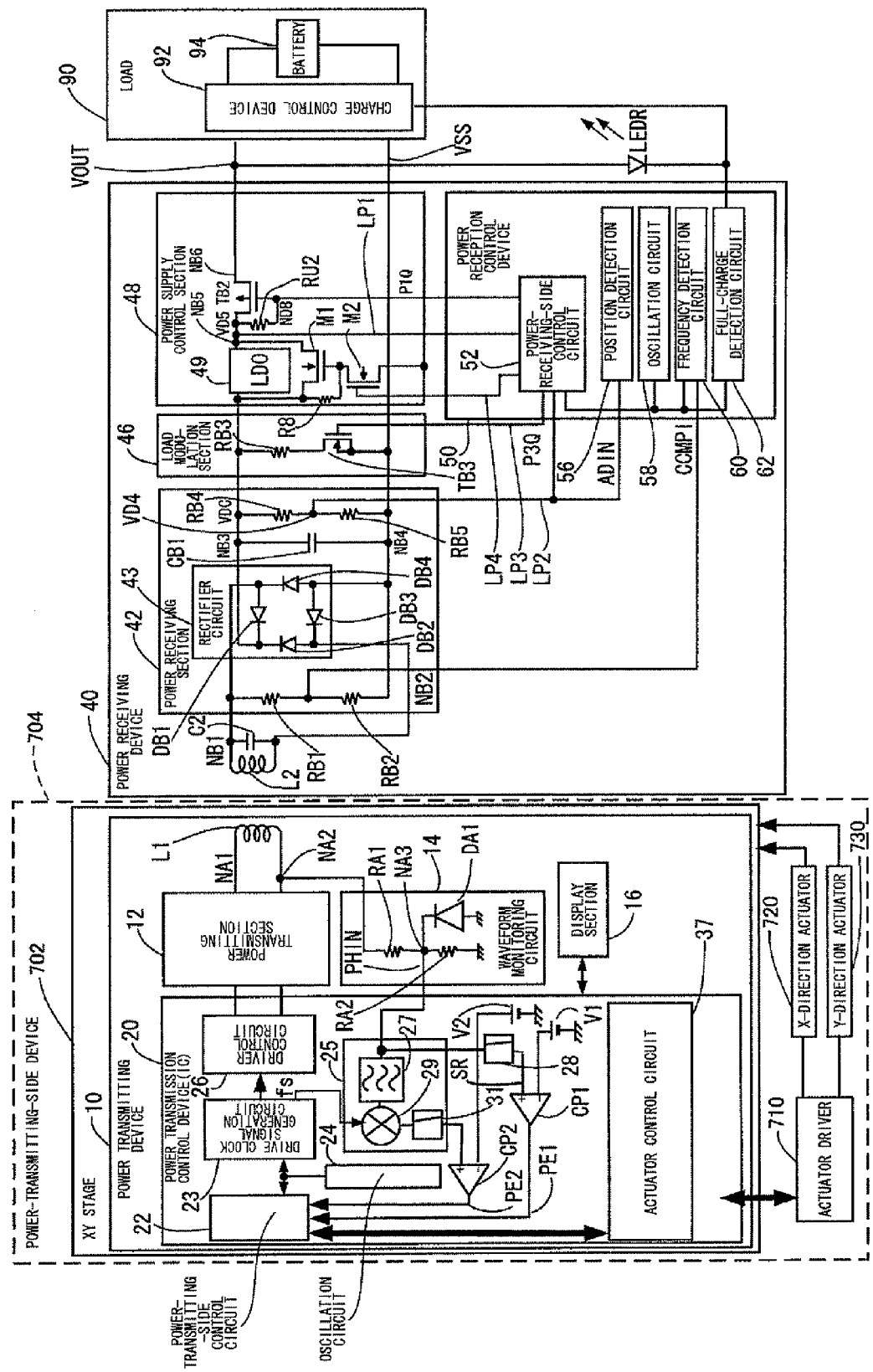
FIG. 2 is a circuit diagram showing an example of a specific configuration of each section of a non-contact power transmission system that includes a power transmitting device and a power receiving device.

FIG. 2 is a circuit diagram showing an example of a specific configuration of each section of a non-contact power transmission system that includes a power transmitting device and a power receiving device.

Configuration and Operation of Power Transmitting Device

As shown in FIG. 2 (left), the power-transmitting-side device (primary-side structure) 704 includes the XY stage (movable stage) 702, the power transmitting device 10 that can be moved by the XY stage 702 in an X-axis direction and a Y-axis direction, an actuator driver 710, an X-direction actuator 720, and a Y-direction actuator 730. Specifically, the power transmitting device 10 is placed on a top plate (movable plate) of the XY stage 702 (described later with reference to FIG. 14).

The power transmitting device 10 includes a power transmission control device 20, a power transmitting section 12, a waveform monitoring circuit 14, and a display section 16 as a notification means. The power transmission control device 20 includes a power-transmitting-side control circuit 22, a drive clock signal generation circuit 23, an oscillation circuit 24, a harmonic detection circuit 25 (including a filter circuit 27, a mixer 29 that adds a harmonic fs, and a detection circuit (waveform detection circuit) 31), a driver control circuit 26, a waveform detection circuit (peak-hold circuit or pulse width detection circuit) 28, comparators (CP1 and CP2), and an actuator control circuit 37.

The power receiving device 40 includes a power receiving section 42, a load modulation section 46, and a power supply control section 48. The power receiving section 42 includes a rectifier circuit 43, a load modulation section 46, a power supply control section 48, and a control section 50, A load 90 includes a charge control device 92 and a battery (secondary battery) 94.

The configuration shown in FIG. 2 implements a non-contact power transmission (contactless power transmission) system that electromagnetically couples the primary coil L1 and the secondary coil L2 to transmit power from the power transmitting device 10 to the power receiving device 40 and supply power (voltage VOUT) to the load 90 from a voltage output node NB6 of the power receiving device 40.

The power transmitting section 12 generates an alternating-current voltage having a given frequency during power transmission, and generates an alternating-current voltage having a frequency that differs depending on data during data transfer. The power transmitting section 12 supplies the generated alternating-current voltage to the primary coil L1.

Figure 3A:
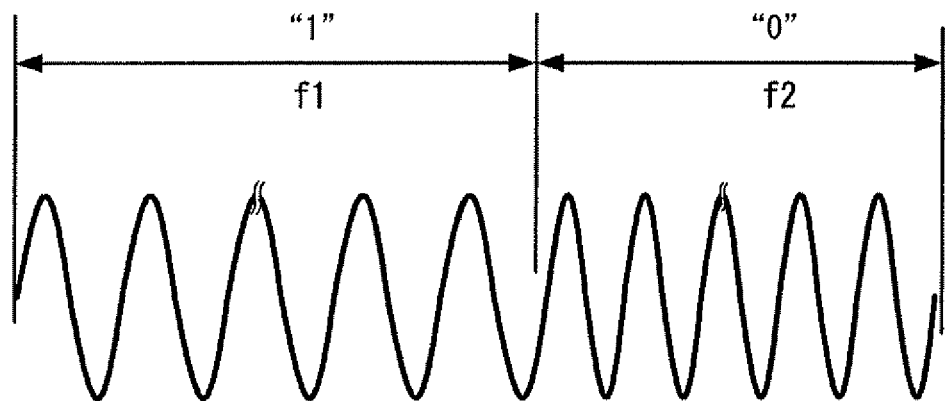
FIGS. 3A and 3B are views illustrative of the principle of information transmission between a primary-side instrument and a secondary-side instrument.
Figure 3B:
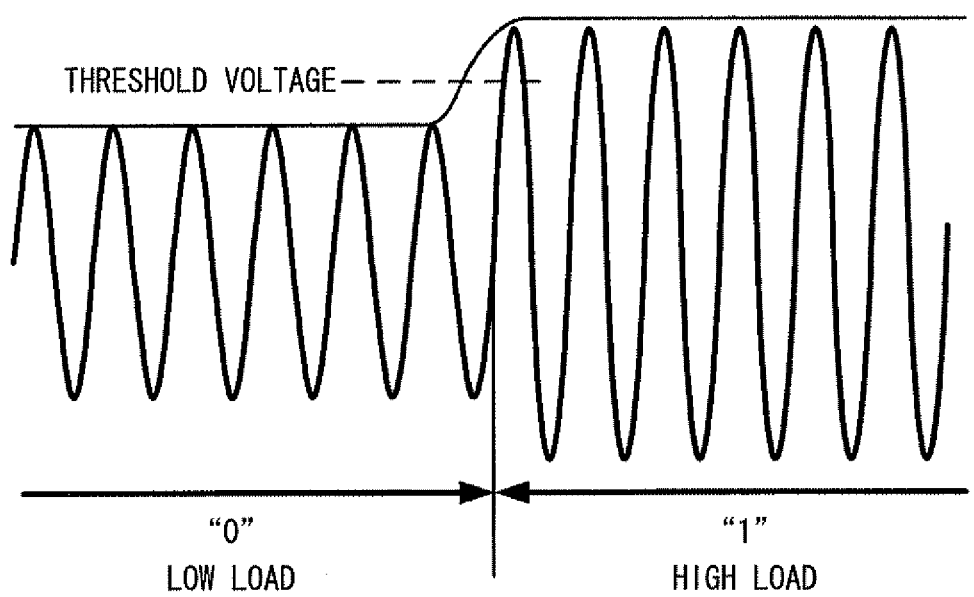

FIGS. 3A and 3B are views illustrative of the principle of information transmission between a primary-side instrument and a secondary-side instrument. Information is transmitted from the primary-side instrument to the secondary-side instrument utilizing frequency modulation. Information is transmitted from the secondary-side instrument to the primary-side instrument utilizing load modulation.

As shown in the FIG. 3A, the power transmitting device 10 generates an alternating-current voltage having a frequency f1 when transmitting data "1" to the power receiving device 40, and generates an alternating-current voltage having a frequency f2 when transmitting data "0" to the power receiving device 40, for example.

As shown in FIG. 3B, the power receiving device 40 can switch the load state between a low-load state and a high-load state by load modulation to transmit data "0" or "1" to the primary-side instrument (power transmitting device 10).

The power transmitting section 12 shown in FIG. 2 may include a first power transmitting driver that drives one end of the primary coil L1, a second power transmitting driver that drives the other end of the primary coil L1, and at least one capacitor that forms a resonant circuit with the primary coil L1. Each of the first and second power transmitting drivers included in the power transmitting section 12 is an inverter circuit (or buffer circuit) that includes a power MOS transistor, for example, and is controlled by the driver control circuit 26 of the power transmission control device 20.

The primary coil L1 (power-transmitting-side coil) is electromagnetically coupled to the secondary coil L2 (power-receiving-side coil) to form a power transmission transformer. For example, when power transmission is necessary, the portable telephone 510 is placed on the flat plate 600 so that a magnetic flux of the primary coil L1 passes through the secondary coil L2, as shown in FIG. 1. When power transmission is unnecessary, the portable telephone 510 is physically separated from the flat plate 600 so that a magnetic flux of the primary coil L1 does not pass through the secondary coil L2.

As the primary coil L1 and the secondary coil L2, a planar coil formed by spirally winding an insulated wire in a single plane may be used, for example. Note that a planar coil formed by spirally winding a twisted wire (i.e., a wire obtained by twisting a plurality of insulated thin wires) may also be used. The type of coil is not particularly limited.

The waveform monitoring circuit 14 is a circuit that detects an induced voltage in the primary coil L1. The waveform monitoring circuit 14 may include resistors RA1 and RA2, and a diode DA1 provided between a common connection point NA3 of the resistors RA1 and RA2 and a power supply GND (low-potential-side power supply in a broad sense), for example. Specifically, a signal PHIN obtained by dividing the induced voltage in the primary coil L1 using the resistors RA1 and RA2 is input to the waveform detection circuit 28 of the power transmission control device 20.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 controls the power transmitting device 10. The power transmission control device 20 may be implemented by an integrated circuit device (IC) or the like. The power transmission control device 20 includes the power-transmitting-side control circuit 22, the drive clock signal generation circuit 23, the oscillation circuit 24, the harmonic detection circuit 25, the driver control circuit 26, the waveform detection circuit (peak-hold circuit or pulse width detection circuit) 28, the comparators CP1 and CP2, and the actuator control circuit 37.

The power-transmitting-side control circuit 22 controls the power transmitting device 10 and the power transmission control device 20. The power-transmitting-side control circuit 22 may be implemented by a gate array, a microcomputer, or the like. Specifically, the power-transmitting-side control circuit 22 performs sequence control and a determination process necessary for power transmission, load detection, frequency modulation, foreign object detection, removal (detachment) detection, and the like.

The oscillation circuit 24 includes a crystal oscillation circuit or the like, and generates a primary-side clock signal. The drive clock signal generation circuit 23 generates a drive control signal having a desired frequency based on a clock signal generated by the oscillation circuit 24 and a frequency setting signal supplied from the power-transmitting-side control circuit 22.

The driver control circuit 26 outputs the drive control signal to the power transmitting drivers (not shown) of the power transmitting section 12 while preventing a situation in which the power transmitting drivers (not shown) are turned ON simultaneously to control the operations of the power transmitting driver, for example.

The waveform detection circuit 28 monitors the waveform of the signal PHIN that corresponds to an induced voltage at one end of the primary coil L1, and performs load detection, foreign object detection, and the like. For example, when the load modulation section 46 of the power receiving device 40 has performed load modulation for transmitting data to the power transmitting device 10, the signal waveform of the induced voltage in the primary coil L1 changes correspondingly.

As shown in FIG. 3B, the amplitude (peak voltage) of the signal waveform decreases when the load modulation section 46 of the power receiving device 40 reduces the load in order to transmit data "0", and increases when the load modulation section 46 increases the load in order to transmit data "1". Therefore, the waveform detection circuit 28 can determine whether the data transmitted from the power receiving device 40 is "0" or "1" by determining whether or not the peak voltage has exceeded a threshold voltage by performing a peak-hold process on the signal waveform of the induced voltage, for example. Note that the waveform detection method is not limited to the above-described method. For example, the waveform detection circuit 28 may determine whether the power-receiving-side load has increased or decreased utilizing a physical quantity other than the peak voltage. For example, whether the power-receiving-side load has increased or decreased may be determined utilizing the peak current.

As the waveform detection circuit 28, a peak-hold circuit (or a pulse width detection circuit that detects the pulse width determined by the phase difference between a voltage and a current) may be used.

Configuration and Operation of Power Receiving Device

The power receiving device 40 (power receiving module or secondary module) may include the secondary coil L2 (including a resonant capacitor C2 connected to each end, and preferably including a magnetic material FS), the power receiving section 42, the load modulation section 46, the power supply control section 48, and a power reception control device 50. Note that the power receiving device 40 and the power reception control device 50 are not limited to the configuration shown in FIG. 2. Various modifications may be made such as omitting some of the elements, adding other elements, or changing the connection relationship.

The power receiving section 42 converts an alternating-current induced voltage in the secondary coil L2 into a direct-current voltage. A rectifier circuit 43 included in the power receiving section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power receiving section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power receiving section 42 are provided between the node NB3 (direct-current voltage VDC) and the node NB4 (VSS). A divided voltage D4 obtained by dividing the voltage between the nodes NB3 and NB4 using the resistors RB4 and RB5 is input to a power-receiving-side control circuit 52 and a position detection circuit 56 through a signal line LP2. The divided voltage VD4 is input to the position detection circuit 56 as a position detection signal input (ADIN).

The load modulation section 46 performs a load modulation process. Specifically, when the power receiving device 40 transmits desired data to the power transmitting device 10, the load modulation section 46 variably changes the load of the load modulation section 46 (secondary side) depending on the transmission target data to change the signal waveform of the induced voltage in the primary coil L1. The load modulation section 46 includes a resistor RB3 and a transistor TB3 (N-type CMOS transistor) provided in series between the nodes NB3 and NB4.

The transistor TB3 is ON/OFF-controlled based on a control signal P3Q supplied from the power-receiving-side control circuit 52 of the power reception control device 50 through a signal line LP3. When performing the load modulation process by ON/OFF-controlling the transistor TB3 and transmitting a signal to the power transmitting device in an authentication stage before main power transmission starts, a transistor TB2 of the power supply control section 48 is turned OFF so that the load 90 is not electrically connected to the power receiving device 40.

For example, when reducing the secondary-side load (high impedance) in order to transmit data "0", the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 is equivalent to the resistor RB3 (high load).

The power supply control section 48 controls power supply to the load 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A switch circuit formed using a PMOS transistor (M1) is provided between the input terminal and the output terminal of the regulator (LDO) 49. A path that bypasses the regulator (LDO) 49 is formed by causing the PMOS transistor (M1) (switch circuit) to be turned ON. For example, since a power loss increases due to the equivalent impedance of the regulator 49 and heat generation increases under heavy load (e.g., when it is necessary to cause an almost constant large current to steadily flow in the initial stage of charging a secondary battery exhausted to a large extent), a current is supplied to the load through a path that bypasses the regulator.

An NMOS transistor (M2) and a pull-up resistor R8 that function as a bypass control circuit are provided to ON/OFF-control the PMOS transistor (M1) (switch circuit).

The NMOS transistor (M2) is turned ON when a high-level control signal is supplied to the gate of the NMOS transistor (M2) through a signal line LP4. This causes the gate of the PMOS transistor (M1) to be set at a low level so that the PMOS transistor (M1) is turned ON, whereby a path that bypasses the regulator (LDO) 49 is formed. When the NMOS transistor (M2) is turned OFF, the gate of the PMOS transistor (M1) is maintained at a high level through the pull-up resistor R8. Therefore, the PMOS transistor (M1) is turned OFF so that the bypass path is not formed.

The NMOS transistor (M2) is ON/OFF-controlled by the power-receiving-side control circuit 52 included in the power reception control device 50.

The transistor TB2 (P-type CMOS transistor) is provided between a power supply voltage (VD5) generation node NB5 (output node of the regulator 49) and the node NB6 (voltage output node of the power receiving device 40), and is controlled based on a signal P1Q output from the power-receiving-side control circuit 52 of the power reception control device 50. Specifically, the transistor TB2 is turned ON when main power transmission is performed after completion (establishment) of ID authentication.

The power reception control device 50 controls the power receiving device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-receiving-side) control circuit 52, the position detection circuit 56, an oscillation circuit 58, the frequency detection circuit 60, and a full-charge detection circuit 62.

The power-receiving-side control circuit 52 controls the power receiving device 40 and the power reception control device 50. The power-receiving-side control circuit 52 may be implemented by a gate array, a microcomputer, or the like. The power-receiving-side control circuit 52 operates based on a constant voltage (VD5) at the output terminal of the series regulator (LDO) 49 as a power supply voltage. The power supply voltage (VD5) is supplied to the power-receiving-side control circuit 52 through a power supply line LP1.

The power-receiving-side control circuit 52 performs sequence control and a determination process necessary for ID authentication, position detection, frequency detection, full-charge detection, load modulation for authentication communication, load modulation for communication that enables detection of foreign object insertion, and the like.

The position detection circuit 56 monitors the waveform of the signal ADIN that corresponds to the waveform of the induced voltage in the secondary coil L2, and determines whether or not the positional relationship between the primary coil L1 and the secondary coil L2 is appropriate.

Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmitting device 10 is "1" or "0".

The full-charge detection circuit 62 (charge detection circuit) detects whether or not the battery 94 of the load 90 has been fully charged (charge state). Specifically, the full-charge detection circuit 62 detects the full-charge state by detecting whether a light-emitting device (LEDR) used to indicate the charge state is turned ON or OFF, for example. The full-charge detection circuit 62 determines that the battery 94 has been fully charged (charging has been completed) when the light-emitting device (LEDR) has been turned OFF for a given period of time (e.g., five seconds).

The charge control device 92 of the load 90 can also detect the full-charge state based on the ON/OFF state of the light-emitting device (LEDR).

The load 90 includes the charge control device 92 that controls charging of the battery 94 and the like. The charge control device 92 detects the full-charge state based on the ON/OFF state of the light-emitting device (LEDR). The charge control device 92 (charge control IC) may be implemented by an integrated circuit device or the like. The battery 94 may be provided with the function of the charge control device 92 (e.g., smart battery). Note that the actual load 90 is not limited to a secondary battery. For example, a given circuit may serve as an actual load when the circuit operates.

Secondary-Side Instrument Approach Detection and Coil Positioning

Figure 4:
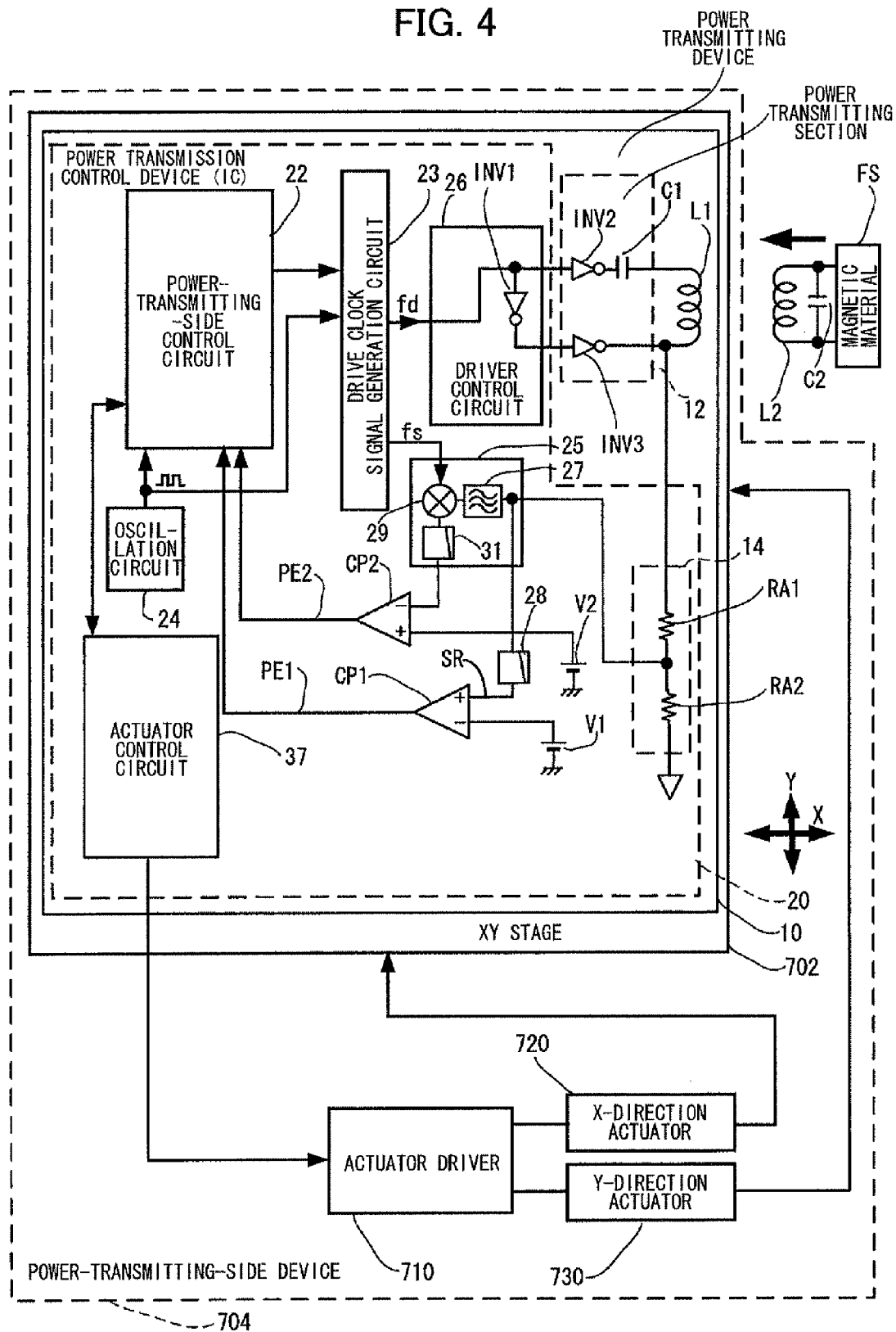
FIG. 4 is a view showing a primary-side (power transmitting device) configuration for secondary-side instrument approach detection and automatic coil positioning.

FIG. 4 is a view showing the configuration of the power transmitting device for secondary-side instrument approach detection and automatic coil positioning. FIG. 4 shows the internal configuration of the power transmitting device 10 shown in the FIG. 2 in detail.

In FIG. 4, the waveform detection circuit 28 is a peak-hold circuit. The waveform detection circuit 28 outputs a peak voltage SR of the coil end voltage. The peak voltage SR may be utilized for detecting the approach of the secondary coil L2. The peak voltage SR is compared with a first threshold value (approach detection threshold value) V1 by the comparator CP1. An output signal PE1 from the comparator CP1 is supplied to the power-transmitting-side control circuit 22.

The harmonic detection circuit 25 includes the filter circuit 27 that filters a voltage signal from the waveform monitoring circuit 14, the mixer 29 that adds an odd-order harmonic (fifth-order harmonic in this example) fs of the primary coil L1, and the detection circuit (waveform detection circuit) 31.

When the resonance frequency of the primary-side series resonant circuit formed by the primary coil L1 and the capacitor C1 is referred to as fp, the drive frequency of the primary coil is generally set at a frequency (fd) away from the resonance frequency (fp) taking operational stability into consideration. When the drive signal of the primary coil is a symmetrical alternating-current signal, the harmonic (fs) of the drive frequency of the primary coil is only an odd-order harmonic. The fifth-order harmonic (fs=5fd) may be used to detect the position of the secondary coil, for example.

The detection output from the harmonic detection circuit 25 is compared with a second threshold value (harmonic resonance peak detection threshold value) V2 by the comparator CP2. An output signal PE2 from the comparator CP2 is supplied to the power-transmitting-side control circuit 22.

The power-transmitting-side control circuit 22 detects the approach of the secondary-side instrument (secondary coil L2) based on the output signal (PE1) from the comparator CP1. The power-transmitting-side control circuit 22 transmits a primary coil (primary-side instrument) scan instruction to the actuator control circuit 37 using the output signal (PE2) from the comparator CP2 as an index. The actuator control circuit 37 drives the actuator in response to the scan instruction from the power-transmitting-side control circuit 22. Note that the output signal (PE2) from the comparator CP2 may be input to the actuator control circuit 37 so that the actuator is driven based on a determination by the actuator.

As shown in FIG. 4 (upper right), the secondary coil (L2) is provided with the harmonic resonant capacitor C2 and the magnetic material FS. The magnetic material FS is a shield that separates a magnetic flux from a circuit, or may be a core of the secondary coil, for example. The primary-side instrument can detect the approach of the secondary coil due to the presence of the magnetic material FS (described later in detail).

Secondary Coil Approach Detection Principle

The secondary coil approach detection principle is described below with reference to FIGS. 5 to 7. FIGS. 5A to 5F are views illustrative of an increase in inductance that occurs when a magnetic material attached to the secondary coil has approached the primary coil. The term "inductance" used herein refers to an inductance (more accurately an apparent inductance) that changes due to the approach of the secondary coil provided with a magnetic material, as described above. The term "apparent inductance" is distinguished from the inductance (self-inductance) of the primary coil (i.e., the inductance of the primary coil when the primary coil is not affected by the secondary coil). In the following description, the apparent inductance is indicated by Lps.

Figure 5A:
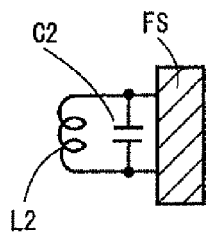
FIGS. 5A to 5F are views illustrative of an increase in inductance that occurs when a magnetic material attached to a secondary coil has approached a primary coil.
Figure 5B:
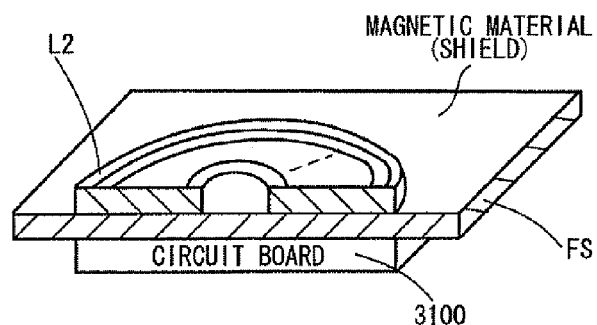

As shown in FIG. 5A, the magnetic material (FS) is attached to the secondary coil L2. As shown in FIG. 5B, the magnetic material (FS) is a magnetic material used as a magnetic shielding material provided between the secondary coil L2 (i.e., planar coil) and a circuit board 3100, for example. Note that the magnetic material (FS) is not limited thereto, but may be a magnetic material used as a core of the secondary coil L2.

Figure 5C:
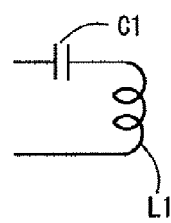
Figure 5D:
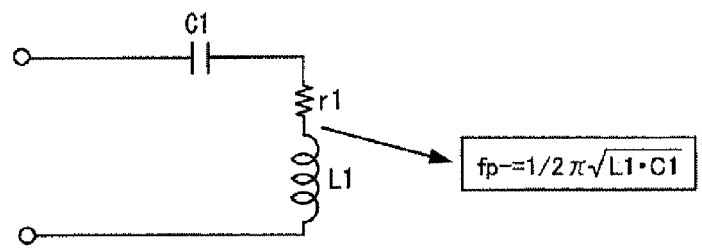
Figure 5F:
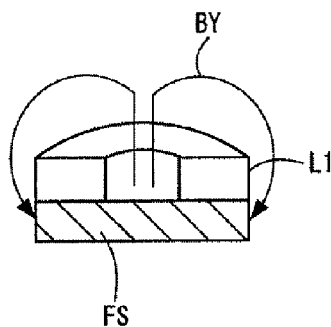
Figure 5E:
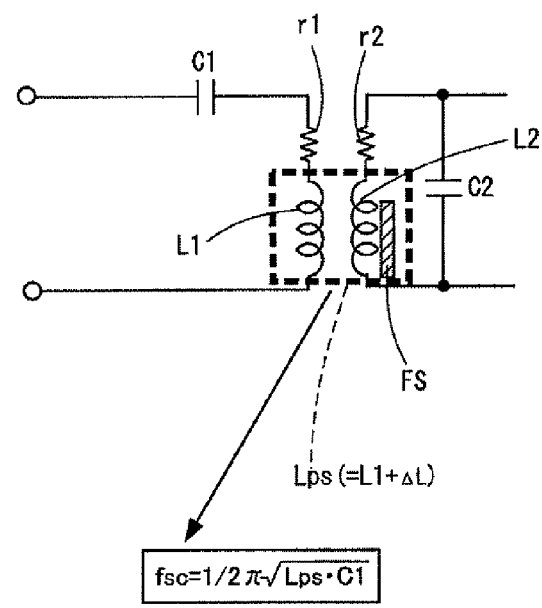

FIG. 5D shows an equivalent circuit of the primary coil L1 shown in FIG. 5C. The resonance frequency of the primary coil L1 is fp. Specifically, the resonance frequency is determined by the primary coil L1 and the capacitor C1. As shown in FIG. 5E, when the secondary coil L2 has approached the primary coil L1, the magnetic material (FS) attached to the secondary coil L1 is coupled to the primary coil L1. Therefore, the magnetic flux of the primary coil (L1) passes through the magnetic material (FS) (see FIG. 5F) so that the magnetic flux density increases. As a result, the inductance of the primary coil L1 increases. In this case, the resonance frequency of the primary coil L1 is fsc, as shown in FIG. 5E. Specifically, the resonance frequency is determined by the apparent inductance Lps (i.e., the apparent inductance of the primary coil for which the approach of the secondary coil is taken into consideration) and the primary-side resonant capacitor C1. The apparent inductance Lps of the primary coil is expressed by Lps=L1+$\Delta$L (where, L1 is the inductance (self-inductance) of the primary coil, and $\Delta$L is an increase in inductance due to the approach of the magnetic material FS to the primary coil). A specific value of the apparent inductance Lps may be acquired by measuring the inductance of the primary coil when the secondary coil has approached the primary coil using a measuring instrument, for example.

A change in the inductance of the primary coil due to the approach of the secondary coil is discussed below.

FIGS. 6A to 6D are views showing examples of the relative positional relationship between the primary coil and the secondary coil. In FIGS. 6A to 6D, PA1 indicates the center of the primary coil L1, and PA2 indicates the center of the secondary coil L2.

In FIG. 6A, since the secondary coil L2 is positioned away from the primary coil L1, the primary coil L1 is not affected by the secondary coil L2. When the secondary coil (L2) has approached the primary coil (L1), as shown in FIG. 6B, the inductance of the primary coil L1 increases, as described with reference to FIGS. 5E and 5F. In FIG. 6C, mutual induction (i.e., an effect that cancels a magnetic flux of one coil by a magnetic flux of the other coil) occurs due to coupling of the primary coil (L1) and the secondary coil (L2) in addition to self-induction.

When the position of the secondary coil (L2) has coincided with the position of the primary coil (L1) (see FIG. 6D), a current flows through the secondary coil (L2). As a result, a leakage magnetic flux decreases due to cancellation of the magnetic flux as a result of mutual induction so that the inductance of the coil decreases. Specifically, the secondary-side instrument starts to operate as a result of positioning. A current flows through the secondary coil (L2) due to the operation of the secondary-side instrument so that a leakage magnetic flux decreases due to cancellation of the magnetic flux as a result of mutual induction, whereby the inductance of the primary coil (L1) decreases.

FIG. 7 is a view showing the relationship between the relative distance between the primary coil and the secondary coil and the inductance of the primary coil. In FIG. 7, the horizontal axis indicates the relative distance, and the vertical axis indicates the inductance. The term "relative distance" used herein refers to a relative value obtained by normalizing the distance between the centers of the two coils in the horizontal direction. The relative distance is an index that indicates the distance between the coils in the horizontal direction. An absolute distance (e.g., an absolute value (mm) that indicates the distance between the centers of the coils in the horizontal direction) may be used instead of the relative distance.

In FIG. 7, when the relative distance is d1, the primary coil L1 is not affected by the secondary coil. In this case, the inductance of the primary coil L1 is "a" (i.e., the self-inductance of the primary coil). When the secondary coil L2 has approached the primary coil L1 (relative distance: d2), the magnetic flux density increases due to the magnetic material so that the inductance of the primary coil L1 increases to "b".

When the secondary coil L2 has further approached the primary coil L1 (relative distance: d3), the inductance of the primary coil L1 increases to "c". When the secondary coil L2 has further approached the primary coil L1 (relative distance: d4), the inductance of the primary coil L1 increases to "d". The primary coil L1 and the secondary coil L2 are coupled in this state so that the effect of mutual inductance becomes predominant.

Specifically, when the relative distance is d5, since the effect of mutual inductance becomes predominant, the inductance of the primary coil L1 then decreases to "e". When the relative distance is 0 (i.e., the centers of the primary coil and the secondary coil are positioned at the center of the XY plane), a leakage magnetic flux is minimized due to cancellation of the magnetic flux so that the inductance of the primary coil L1 converges to a constant value ("center inductance" in FIG. 7).

The relative distance d2 is the power transmission limit range. In this case, it is possible to detect that the secondary coil (L2) has approached the primary coil L1 up to the relative distance d2 using an inductance threshold value (INth1).

Specifically, when an increase in inductance due to the approach of the secondary coil (L2) has been detected using the first inductance threshold value (INth1), the secondary coil L2 has approached the primary coil L1 to such an extent that the relative distance is almost within the power transmission range.

Note that the approach of the secondary coil is actually determined using a voltage threshold value (first threshold value V1) corresponding to the inductance threshold value (INth1).

In this embodiment, the power transmitting section 12 intermittently (e.g., cyclically) drives the primary coil (L1) in order to automatically detect the approach of the secondary coil (L2). This enables automatic detection of the approach of the secondary coil (secondary-side instrument).

When the approach of the secondary coil (L2) has been detected, a secondary coil position detection operation utilizing harmonic resonance is performed.

The details are described below.

Figure 8:
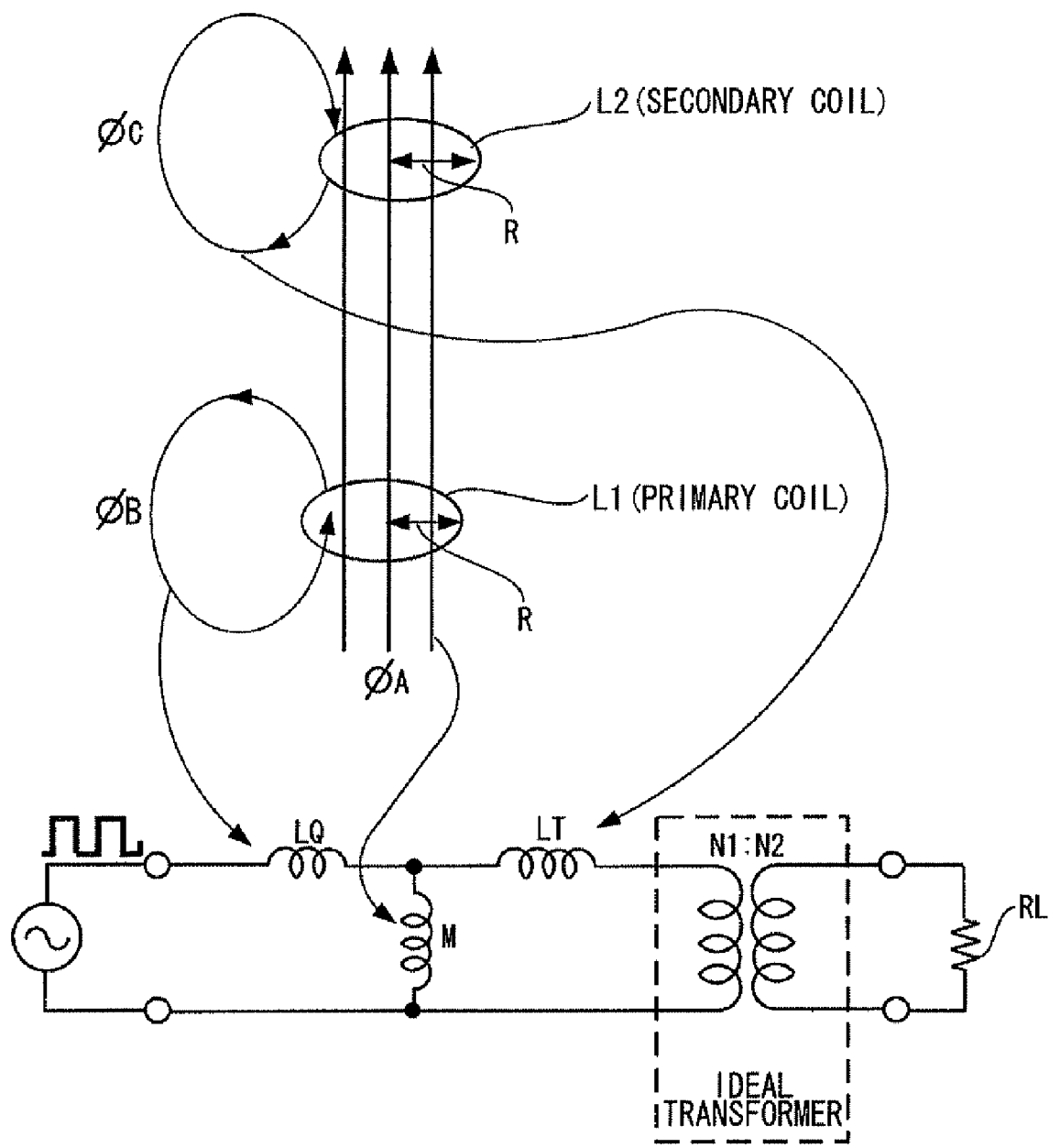
FIG. 8 is a view illustrative of the concept of a leakage inductance in a transformer formed by electromagnetically coupling a primary coil and a secondary coil.

Principle of Detecting Relative Positional Relationship Between Primary Coil and Secondary Coil Utilizing Harmonic Resonance FIG. 8 is a view illustrative of the concept of a leakage inductance in a transformer formed by electromagnetically coupling the primary coil and the secondary coil. The upper part of FIG. 8 shows the state of a magnetic flux between the coils disposed adjacently, and the lower part of FIG. 8 shows an equivalent circuit of the transformer.

In FIG. 8, the primary coil (L1) and the secondary coil (L2) are circular coils having a radius of R. When a magnetic flux φA generated from the primary coil (L1) is interlinked to the secondary coil (L2), a current flows through the secondary coil (L2) due to mutual induction to cancel the magnetic flux of the primary coil (L1) so that the magnetic flux apparently becomes zero. Specifically, the mutual inductance M of the transformer ideally becomes zero.

However, a leakage magnetic flux φB exists in the primary coil (L1), and a leakage magnetic flux φC exists in the secondary coil (L2). A primary-side leakage inductance LQ occurs due to the primary-side leakage magnetic flux φB, and a secondary-side leakage inductance LT occurs due to the secondary-side leakage magnetic flux φC. It is considered that an ideal transformer exists in theory. However, it is not related to the leakage inductance model and may be disregarded.

Figure 9A:
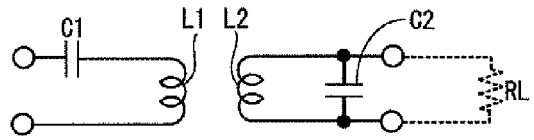
Figure 9B:
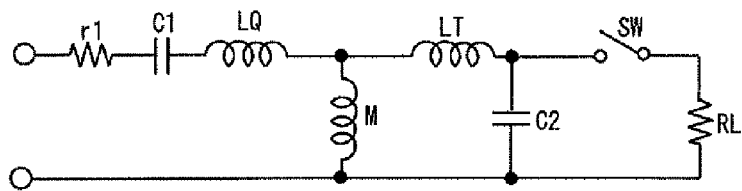
Figure 9C:
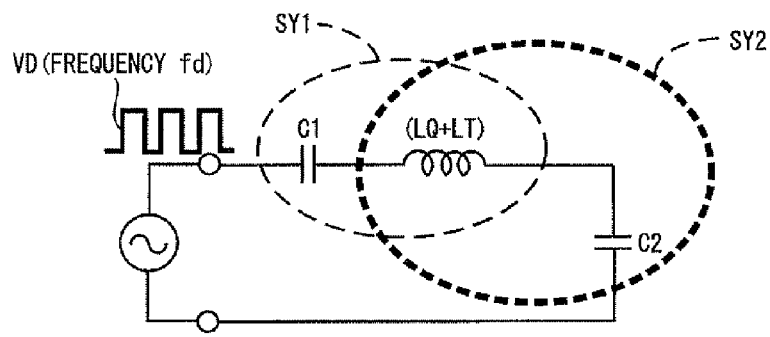
Figure 9C:
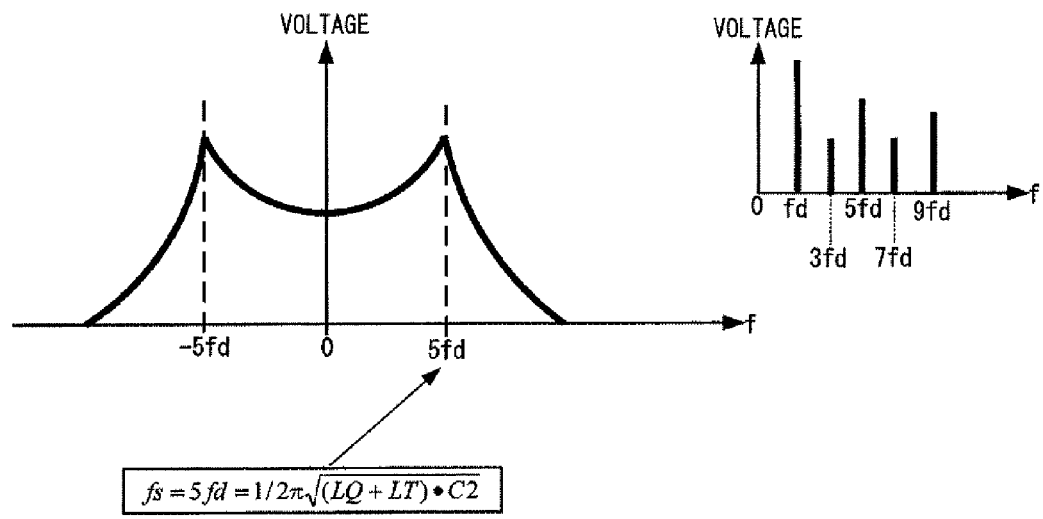

FIGS. 9A to 9E are views illustrative of the configuration and the operation of a harmonic resonant circuit. As shown in FIG. 9A, the harmonic resonant capacitor C2 is connected to the secondary coil (L2). FIG. 9B show an equivalent circuit of the transformer in this case. The secondary-side load (RL) is not connected before power transmission. Since the mutual inductance is substantially zero, as described above, the mutual inductance can be disregarded. Since the primary-side leakage inductance (LQ) and the secondary-side leakage inductance (LT) are connected in series, the composite inductance of the primary-side leakage inductance (LQ) and the secondary-side leakage inductance (LT) is (LQ+LT). Therefore, the equivalent circuit of the transformer can be modified as shown in FIG. 9C.

As shown in FIG. 9C, two resonant circuits SY1 and SY2 are formed. The following description focuses only on the resonant circuit SY2 while disregarding the resonant circuit SY1. FIG. 9D shows odd-order harmonics of the drive frequency (fd) of the drive signal (VD) of the primary coil (L1). The following description focuses on the fifth-order harmonic (5fd) (note that the harmonic is not limited thereto; the third-order harmonic, the seventh-order harmonic, or the like may also be used).

In this embodiment, the capacitance of the capacitor C2 is set so that the resonance frequency fs of the resonant circuit SY2 coincides with the fifth-order harmonic (5fd) of the drive frequency of the primary coil (L1), as indicated by an expression shown in FIG. 9E. Therefore, the resonant circuit SY2 is a harmonic resonant circuit that resonates with the fifth-order harmonic of the drive frequency of the primary coil. Therefore, the equivalent circuit shown in FIG. 9C has resonance characteristics shown in FIG. 9E. The harmonic resonance peak is obtained at a position 5fd on the frequency axis. In this case, $fs=5fd=1/\{2\pi(LQ+LT)\cdot C2\}^{1/2}$ is satisfied. In the above expression, fs indicates the resonance frequency, and 5fd indicates the fifth-order harmonic.

As described above, a leakage inductance is an inductance produced by a leakage magnetic flux that does not undergo interlinkage. The amount of leakage magnetic flux differs depending on the relative positional relationship between the primary coil (L1) and the secondary coil (L2).

Therefore, when the capacitance of the capacitor C2 of the harmonic resonant circuit SY2 described with reference to FIG. 9 is set taking into account the leakage inductance when the position of the primary coil coincides with the position of the secondary coil, the harmonic resonant circuit SY2 undergoes harmonic resonance when the position of the primary coil coincides with the position of the secondary coil, for example. When the capacitance of the capacitor C2 is set taking into account the leakage inductance when the primary coil and the secondary coil are positioned at a given distance R, the harmonic resonant circuit SY2 undergoes harmonic resonance when the primary coil (L1) and the secondary coil (L2) are positioned at the given distance R.

Figure 10A:
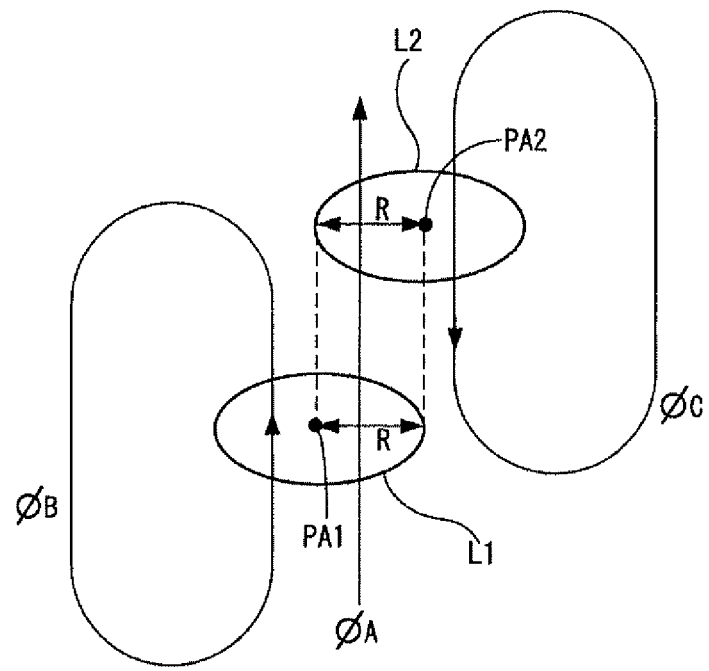
FIGS. 10A and 10B are views illustrative of a harmonic resonant circuit that resonates when a primary coil and a secondary coil are positioned at a given distance R.
Figure 10B:
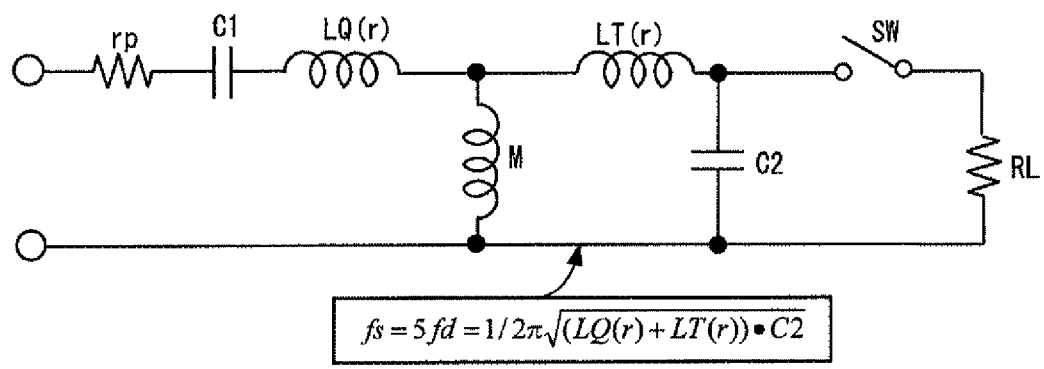

FIGS. 10A and 10B are views illustrative of a harmonic resonant circuit that resonates when the primary coil and the secondary coil are positioned at the given distance R. As shown in FIG. 10A, when the capacitance of the capacitor C2 is set taking into account the leakage inductances (φB and φC) when the distance between the center of the primary coil (L1) and the center of the secondary coil (L2) is R, the harmonic resonant circuit SY2 undergoes harmonic resonance when the primary coil (L1) and the secondary coil (L2) are positioned at a given distance R.

As shown in FIG. 10B, when the leakage inductances when the primary coil (L1) and the secondary coil (L2) are positioned at the given distance R are referred to as LQ(R) and LT(R), the harmonic resonant circuit SY2 is caused to undergo harmonic resonance when the primary coil (L1) and the secondary coil (L2) are positioned at the given distance R by setting the capacitance of the capacitor C2 to satisfy the expression shown in FIG. 10B.

Figure 11A:
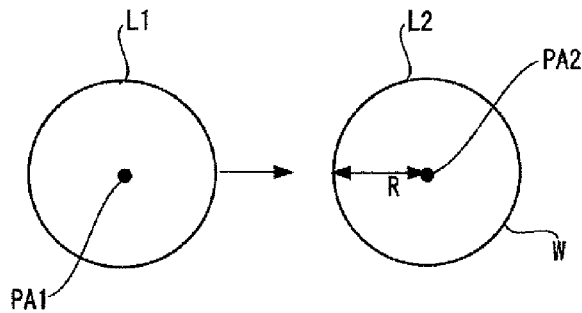
FIGS. 11A to 11D are views illustrative of a position at which the harmonic resonance peak is obtained when scanning a primary coil with respect to a secondary coil.

FIGS. 11A to 11D are views illustrative of a position at which the harmonic resonance peak is obtained when scanning the primary coil with respect to the secondary coil. As shown in FIG. 11A, the center of the primary coil (L1) is referred to as PA1, and the center of the secondary coil (L2) is referred to as PA2.

Figure 11B:
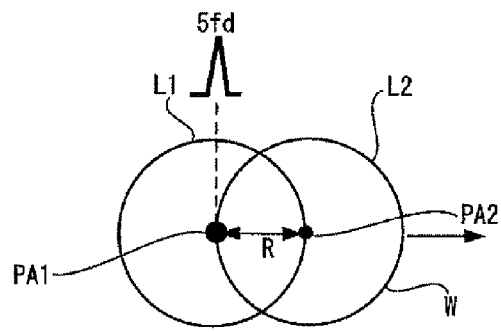
Figure 11C:
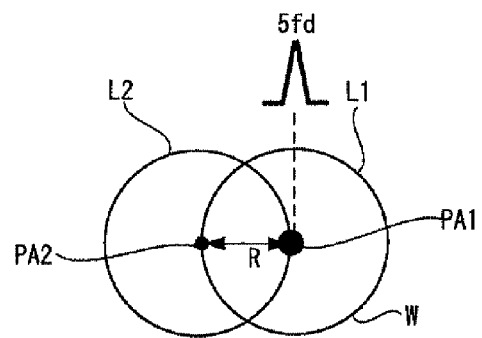

As shown in FIG. 11A, the primary coil (L1) is scanned linearly from the left toward the secondary coil (L2). In this case, the harmonic resonance peak is obtained when the primary coil (L1) approaches the secondary coil (L2) so that the distance between the primary coil (L1) and the secondary coil (L2) is R, as shown in FIG. 11B. The harmonic resonance peak is also obtained when the primary coil (L1) moves away from the secondary coil (L2), as shown in FIG. 11C.

Figure 11D:
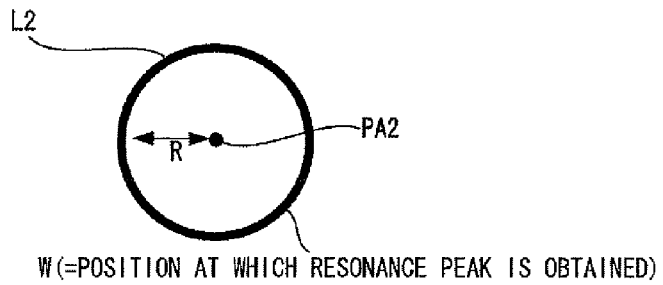

When the primary coil (L1) is scanned along an arbitrary axis that intersects the secondary coil (L2) in a stationary state, the resonance peak is obtained at a position on a circumference at a distance R from the center PA2 of the secondary coil (L2), as shown in FIG. 11D. Specifically, when a position at which the harmonic resonance peak is obtained is referred to as W, the position W coincides with the outermost circle of the secondary coil (L2).

Figure 12:
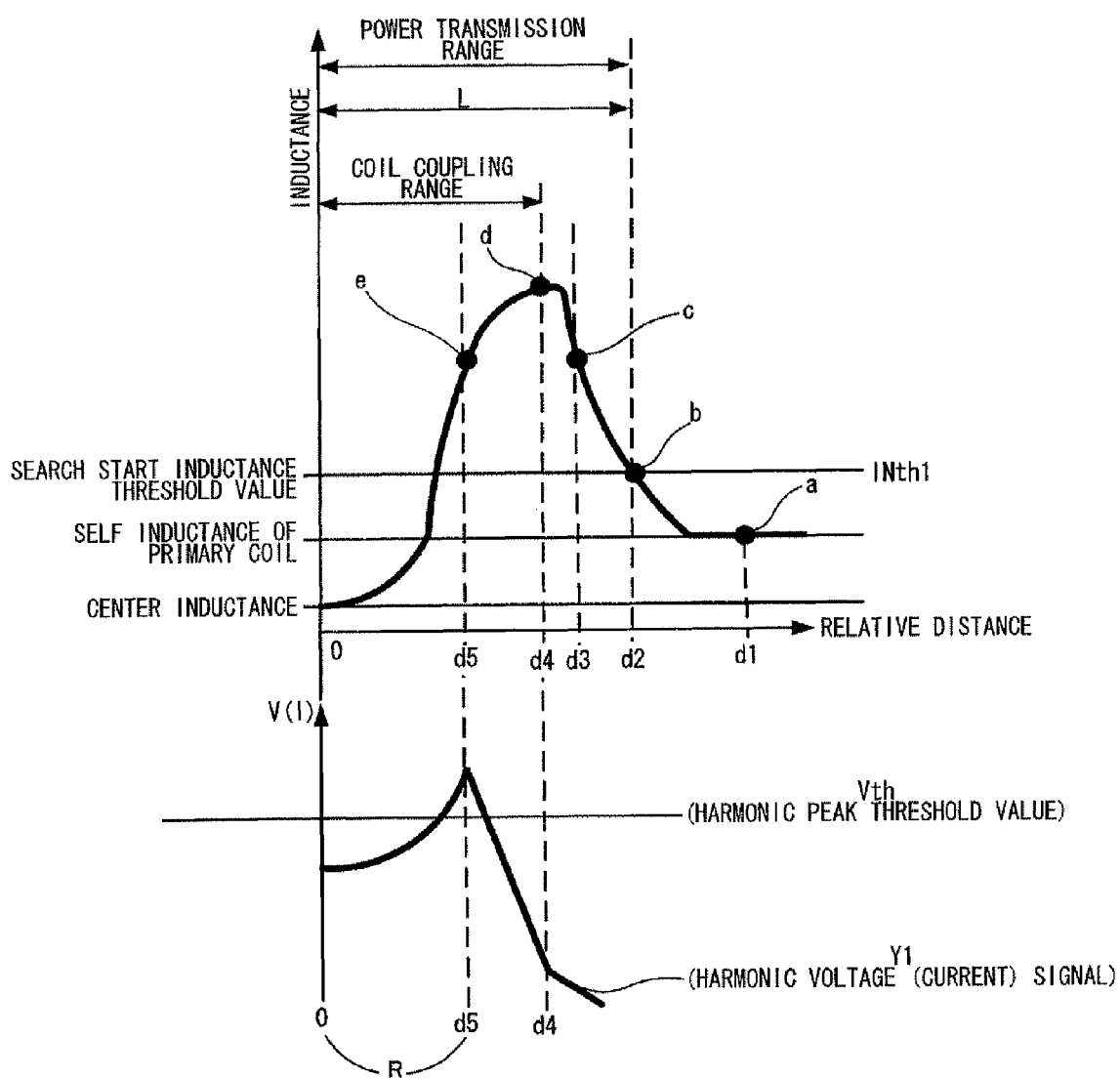
FIG. 12 is a view showing an example of a change in inductance of a primary coil and an example of a change in harmonic voltage obtained from a harmonic detection circuit when a primary coil approaches a secondary coil.

FIG. 12 is a view showing an example of a change in the inductance of the primary coil and an example of a change in the harmonic voltage obtained from the harmonic detection circuit when the primary coil approaches the secondary coil. The upper part of FIG. 12 is the same as FIG. 7.

As shown in the lower part of FIG. 12, the harmonic resonance peak is obtained by the harmonic detection circuit 25 when the distance between the primary coil and the secondary coil is R (=relative distance d5). Therefore, the harmonic peak can be detected by comparing the output from the harmonic detection circuit 25 with a harmonic peak detection threshold voltage (V2).

As described with reference to FIG. 7, the approach of the secondary coil can be detected by a decrease in coil end voltage (coil current) due to an increase in the inductance of the primary coil when the distance between the center of the primary coil and the center of the secondary coil is L (=relative distance d2).

As shown in FIG. 12, the distance R (distance at which the harmonic resonance peak occurs) is shorter than the distance L (approach detection distance) (R<L). Specifically, a situation in which the secondary coil has approached the primary coil within the distance L is detected by approach detection, and a situation in which the primary coil and the secondary coil have been positioned at the distance R is detected by the harmonic detection.

Note that the distance R (distance at which the harmonic resonance peak occurs) may be zero (R=0). Specifically, when harmonic resonance has occurred when R=0 (i.e., when the position of the primary coil coincides with the position of the secondary coil), the primary coil and the secondary coil can be positioned by moving the primary-side instrument by trial and error using the harmonic peak as an index, or the primary coil and the secondary coil can be positioned by manually moving the secondary-side instrument. Moreover, placement or removal (leave) of the secondary-side instrument can be detected depending on the presence or absence of the harmonic peak.

Figure 13A:
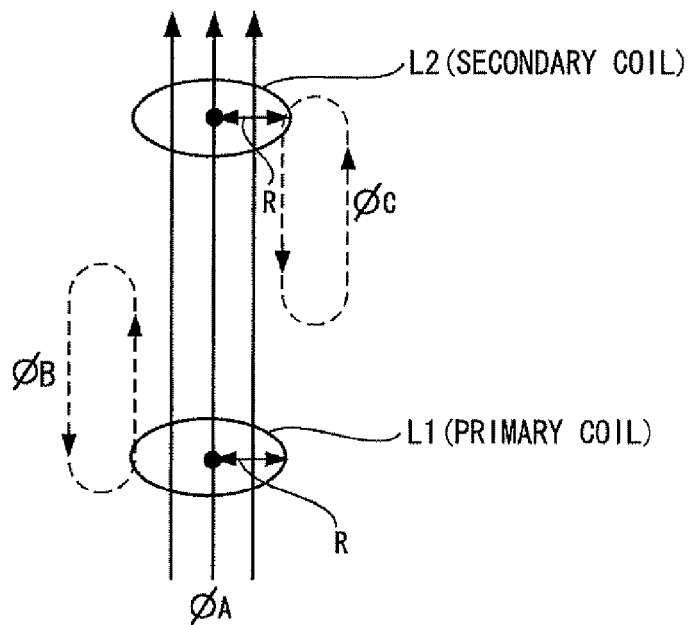
FIGS. 13A and 13B are views illustrative of a harmonic resonant circuit that resonates when the position of a primary coil coincides with the position of a secondary coil.
Figure 13B:
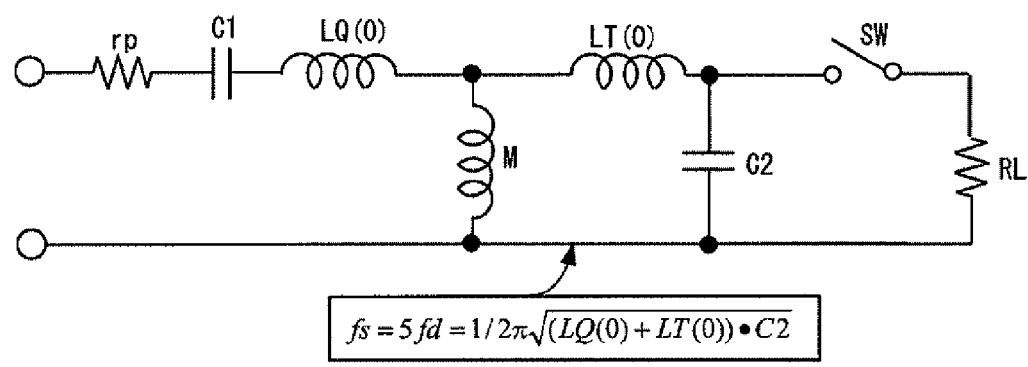

FIGS. 13A and 13B are views illustrative of a harmonic resonant circuit that resonates when the position of the primary coil coincides with the position of the secondary coil. As shown in FIG. 13A, when the capacitance of the capacitor C2 is set taking into account the leakage inductances ($\phi$B and $\phi$C) when the center of the primary coil (L1) coincides with the center of the secondary coil (L2, the harmonic resonant circuit SY2 undergoes harmonic resonance when the position of the primary coil (L1) coincides with the position of the secondary coil (L2).

As shown in FIG. 13B, when the leakage inductances when the position of the primary coil coincides with the position of the secondary coil are referred to as LQ(0) and LT(0), the harmonic resonant circuit SY2 undergoes harmonic resonance when the position of the primary coil (L1) coincides with the position of the secondary coil (L2) by setting the capacitance of the capacitor C2 to satisfy the expression shown in FIG. 13B.

Scanning Primary Coil Using Harmonic Detection Output as Index

Figure 14A:
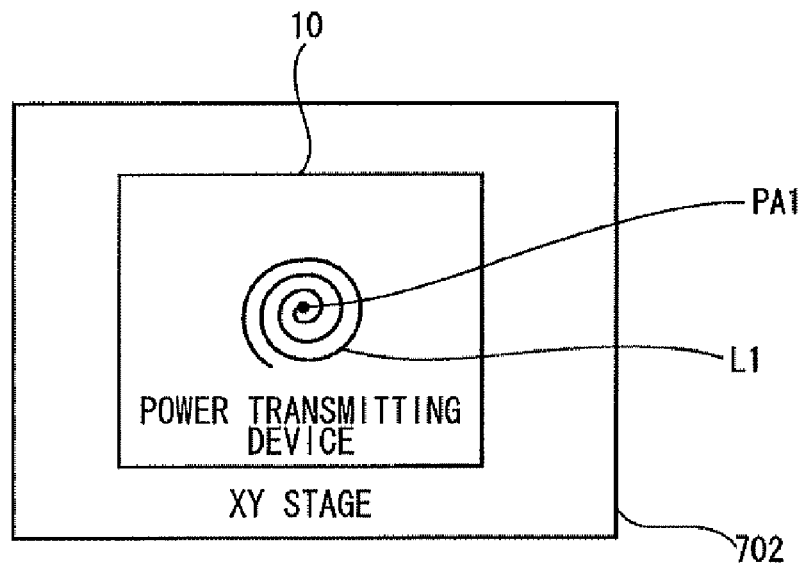
FIGS. 14A and 14B are views illustrative of a primary coil positioning method that scans a primary coil by trial and error using a detection output from a harmonic resonant circuit as an index.
Figure 14B:
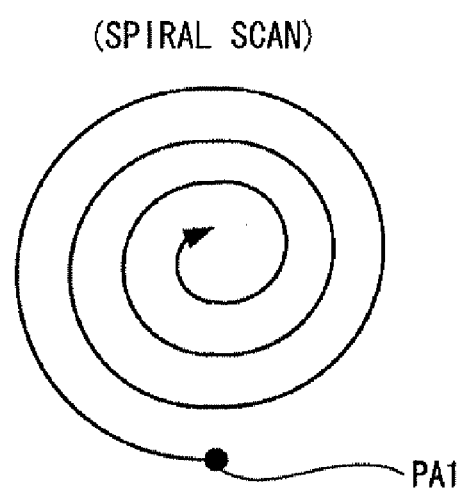

FIGS. 14A and 14B are views illustrative of a primary coil positioning method that scans the primary coil by trial and error using the detection output from the harmonic resonant circuit as an index. The primary coil may be moved by trial and error by moving the primary coil based on a given movement sequence (e.g., based on a spiral scan sequence), or moving the primary coil at random, for example. The following description is given taking an example in which the primary coil is scanned spirally (note that various scan patterns such as a zigzag scan may also be employed).

As shown in FIG. 14A, the power transmitting device 10 including the primary coil (L1) is placed on the XY stage 702. In FIG. 30A, PA1 indicates the center of the primary coil.

When the power-transmitting-side control circuit 22 included in the power transmission control device 20 has detected placement of the secondary-side instrument by the above-described approach detection, the power-transmitting-side control circuit 22 causes the actuator control circuit 37 to move the XY stage 702 so that the primary coil L1 is scanned spirally, as shown in FIG. 14B.

Specifically, the primary coil is gradually moved so that the center PA1 of the primary coil L1 draws a spiral. The power-transmitting-side control circuit 22 determines whether or not the output level of the harmonic detection circuit 25 has exceeded the threshold voltage V2 using the comparator CP2 while moving the primary coil L1. The power-transmission-side control circuit 22 stops scanning the primary coil (L1) when the output level of the harmonic detection circuit 25 has exceeded the threshold voltage V2.

Specifically, if the harmonic resonant circuit (SY2 in FIG. 9) formed in the secondary-side instrument resonates when the position of the primary coil (L1) coincides with the position of the secondary coil (L2), for example, the position of the primary coil (L1) should coincide with the position of the secondary coil (L2) when the output level of the harmonic detection circuit 25 has exceeded the threshold voltage V2. This means that the primary coil (L1) has been positioned with respect to the secondary coil (L2).

Figure 15:
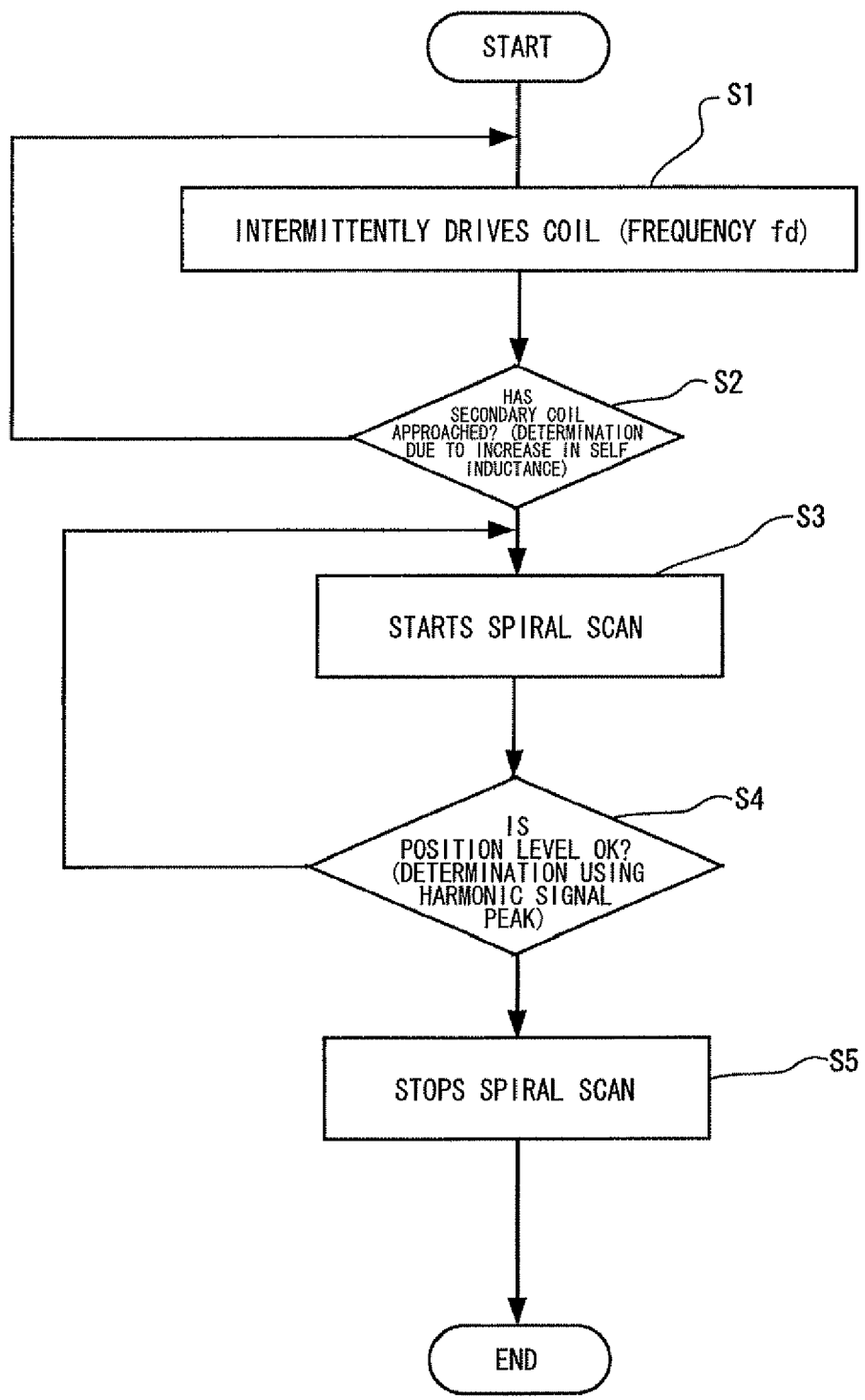
FIG. 15 is a flowchart showing a process of scanning a primary coil using a harmonic detection output as an index.

The primary coil (L1) can thus be automatically positioned by scanning the primary coil (L1) using the harmonic detection output as an index. FIG. 15 shows a summary of the above-described process.

FIG. 15 is a flowchart showing the process of scanning the primary coil using the harmonic detection output as an index.

The power-transmitting-side control circuit 22 intermittently (e.g., cyclically) drives the primary coil at the drive frequency fd in order to automatically detect placement of the secondary-side instrument (i.e., the approach of the secondary coil) (step S1), and detects the approach of the secondary coil by detecting a decrease in coil end voltage (coil current) due to an increase in inductance (step S2).

When the power-transmitting-side control circuit 22 has detected placement of the secondary-side instrument by the above-described approach detection, the power-transmitting-side control circuit 22 causes the actuator control circuit 37 to move the XY stage 702 so that the primary coil is scanned spirally, for example (step S3), and determines whether or not the harmonic detection output level has exceeded the given threshold voltage (i.e., whether or not the desired positional relationship has been achieved) while scanning the primary coil (step S4). When the primary coil and the secondary coil have satisfied the desired positional relationship, the power-transmission-side control circuit 22 stops scanning (spirally scanning) the primary coil.

Configuration Example and Operation of XY Stage

Figure 16:
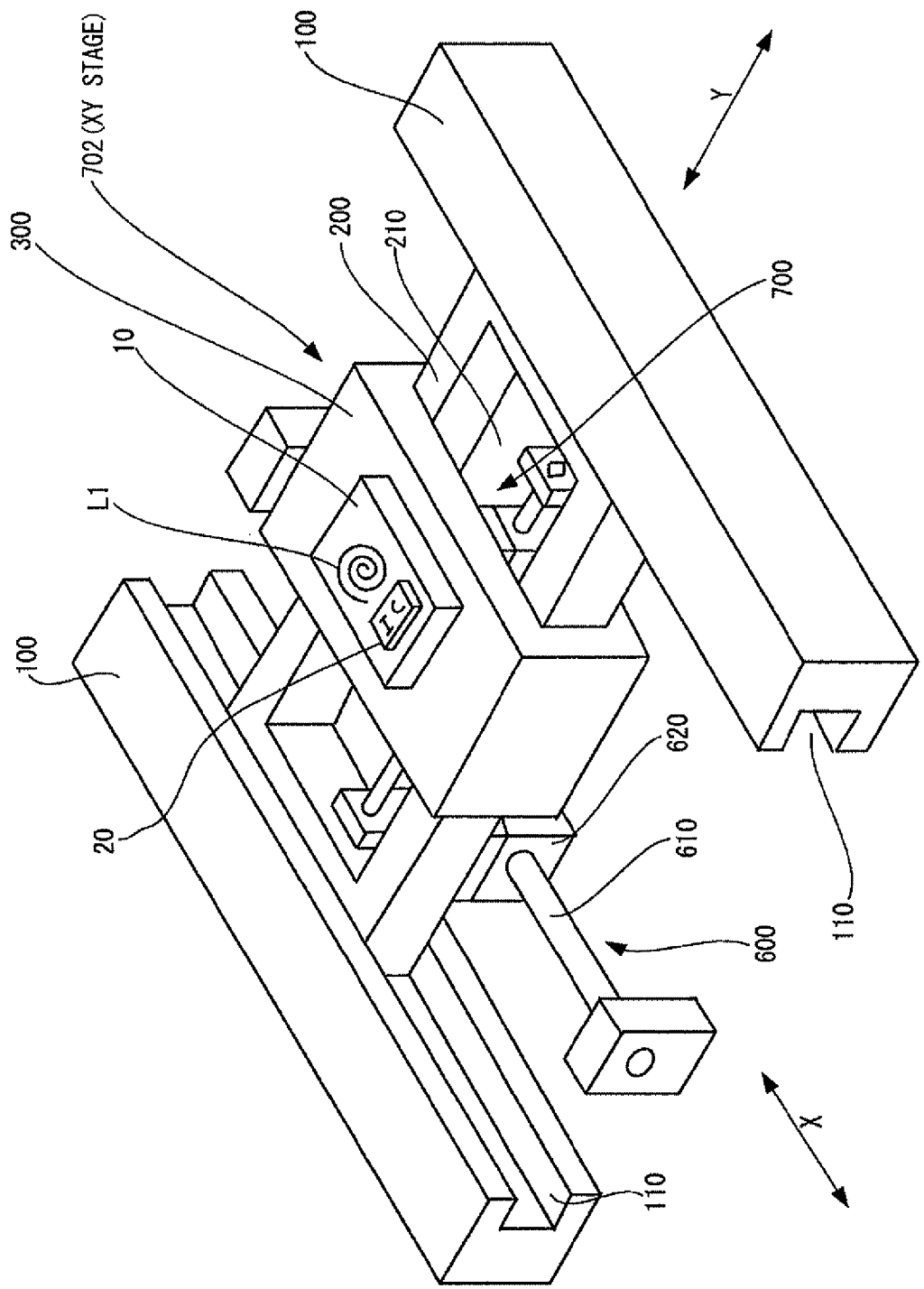
FIG. 16 is a perspective view showing the basic configuration of an XY stage.

An example of the configuration of the XY stage and the operation of the XY stage are described below. FIG. 16 is a perspective view showing the basic configuration of the XY stage.

As shown in FIG. 16, the XY stage 702 includes a pair of guide rails 100, an X-axis slider 200, and a Y-axis slider 300. Aluminum, iron, granite, a ceramic, or the like is used as the material for these members.

The guide rails 100 respectively have guide grooves 110 opposite to each other. The guide rails 100 extend in parallel in the X-axis direction. The guide rails 100 are secured on a surface plate (not shown).

The X-axis slider 200 engages the guide rails 100. The X-axis slider 200 is in the shape of a rectangular flat plate. The ends of the X-axis slider 200 are fitted into the guide grooves 110 so that the X-axis slider 200 can be moved in the X-axis direction along the guide grooves 110, but cannot be moved in the Y-axis direction. Therefore, the X-axis slider 200 can be reciprocated in the X-axis direction along the guide rails 100.

Note that the guide groove 10 formed in the guide rail 100 may be formed in the X-axis slider 200, and the guide rail 100 may have a protrusion that is fitted into the guide groove formed in the X-axis slider 200. It suffices that the engagement portion of the guide rail 100 and the X-axis slider 200 be supported on three sides. The shape of the guide groove is not particularly limited.

The Y-axis slider 300 is provided to enclose the X-axis slider 200. The Y-axis slider 300 has a cross-sectional shape (almost in the shape of the letter U) corresponding to the cross-sectional shape of the X-axis slider 200 in the shape of a rectangular flat plate.

The end of the Y-axis slider 300 almost in the shape of the letter U is bent inward. The upper part of the Y-axis slider 300 may be open. Alternatively, the Y-axis slider 300 may have a cross-sectional shape having no opening.

The ends of the X-axis slider 200 in the widthwise direction that engage the guide grooves 110 are thus supported by the Y-axis slider 300 on the upper side, the side, and the lower side. Since the Y-axis slider 300 is secured on the X-axis slider 200, the movement of the Y-axis slider 300 in the X-axis direction with respect to the X-axis slider 200 is prevented. When the X-axis slider 200 is moved in the X-axis direction, the Y-axis slider 300 moves in the X-axis direction together with the X-axis slider 200.

The Y-axis slider 300 can be moved in the Y-axis direction with respect to the X-axis slider 200. The X-axis slider 200 functions as an X-axis direction moving member, and also serves as a guide that allows the Y-axis slider 300 to move in the Y-axis direction with respect to the X-axis slider 200. The upper part of the Y-axis slider 300 serves as a top plate (movable main surface) on which an object that is moved along the XY axes is placed.

As shown in FIG. 16, the power transmission device 10 including the primary coil (circular wound coil) L1 and the power transmission control device 20 (IC) is provided on the main surface (top plate) of the Y-axis slider 300. When the primary coil L1 is a wound coil, the volume and the height of the coil can be reduced. This is advantageous when scanning the primary coil L1. Note that the type of the primary coil is not limited to the above-described example.

The XY stage 702 shown in FIG. 16 utilizes a highly accurate linear motor as a drive source. A ball screw mechanism may be used instead of the linear motor.

An X-axis linear motor 600 that moves the X-axis slider 200 is provided between the pair of guide rails 100. A movable member 620 of the X-axis linear motor 600 secured on a rod-shaped stator 610 is secured on the lower part of the X-axis slider 200 so that the X-axis slider 200 can be reciprocated.

The Y-axis slider 300 is reciprocated by a Y-axis linear motor 700. A depression 210 is formed in the X-axis slider 200, and the Y-axis linear motor is placed in the depression 210. Therefore, the stage height can be reduced.

The X-axis linear motor 600 and the Y-axis linear motor 700 respectively correspond to the X-direction actuator 720 and the Y-direction actuator 730 shown in FIG. 2.

The power-transmitting-side device (i.e., the primary-side structure of the non-contact power transmission system) 704 is formed by placing the power transmission device 10 including the primary coil (circular wound coil) L1 and the power transmission control device 20 (IC) on the XY stage 702.

As shown in FIG. 1B, the power-transmitting-side device 704 is provided in a structure (e.g., desk) having a flat surface, for example. This implements the power-transmitting-side device 704 that deals with a next-generation non-contact power transmission system capable of automatically moving the position of the primary coil in the XY plane corresponding to the position of a secondary coil of a secondary-side instrument (e.g., portable terminal) placed at an approximate position.

As described above, the power transmission control device 20 according to this embodiment intermittently drives the primary coil, and always monitors whether or not the coil end voltage (current) has decreased due to an increase in primary-side inductance. When the approach of the secondary-side instrument (i.e., the secondary-side instrument has been placed in a given area Z1) has been detected, the actuator control circuit 37 automatically adjusts the position of the primary coil.

Since the secondary-side instrument approach detection process and the primary coil position adjustment process are automatically performed, the user's workload is reduced. Note that the approach detection process may not be performed, or the position of the primary coil may be manually adjusted.

Second Embodiment

In this embodiment, the primary-side instrument is not provided with the primary coil scan mechanism using the actuator. The user positions the primary coil and the secondary coil by manually moving the secondary-side instrument. The details are described below.

Figure 17:
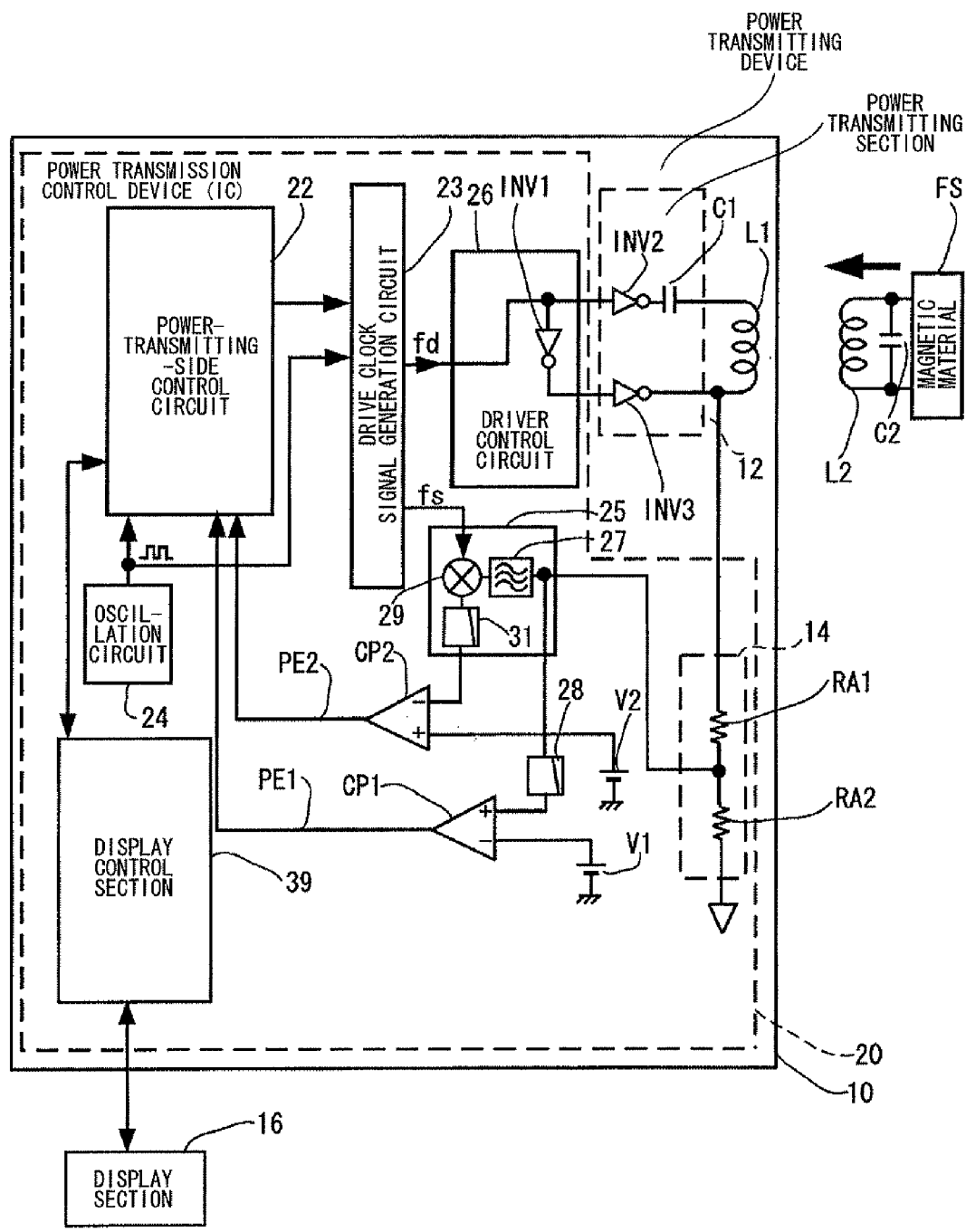
FIG. 17 is a view showing another configuration of a power transmitting device (configuration that detects the approach of a secondary-side instrument and notifies the user of coil relative positional relationship information).

FIG. 17 is a view showing another configuration of the power transmitting device (configuration that detects the approach of the secondary-side instrument and notifies the user of coil relative positional relationship information). The main configuration shown in FIG. 17 is the same as that shown in FIG. 4. The power transmitting device shown in FIG. 17 differs from that shown in FIG. 4 in that a display control section 39 is provided instead of the actuator control circuit 37.

Specifically, a power transmitting device 10 shown in FIG. 17 (power transmission control device 20) merely has a function of notifying the user of a detection result (relative positional relationship information) for the relative positional relationship between the primary coil and the secondary coil based on the harmonic detection output of the harmonic detection circuit 25 using the display section 16. The power transmitting device 10 may notify the user of the detection result using sound or the like.

Figure 18A:
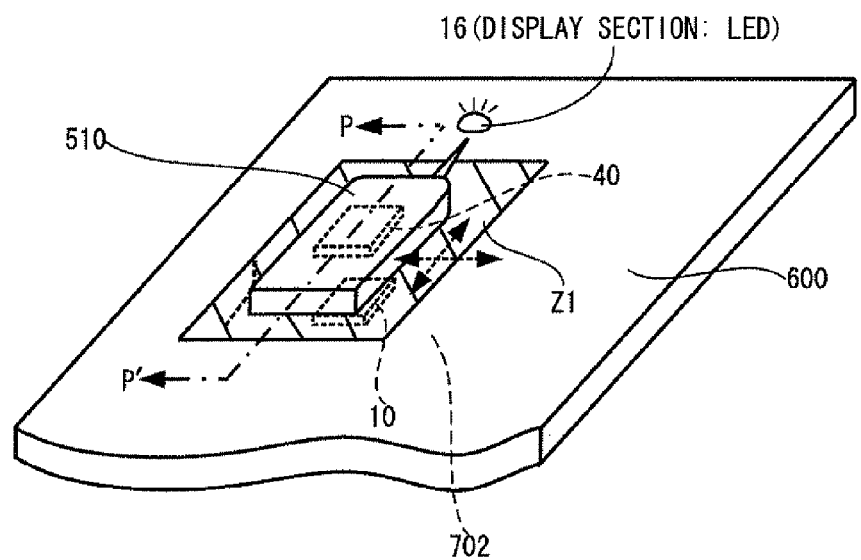
FIGS. 18A and 18B are views showing an example of an application of a non-contact power transmission system using a power transmitting device having a configuration shown in FIG. 17.
Figure 18B:
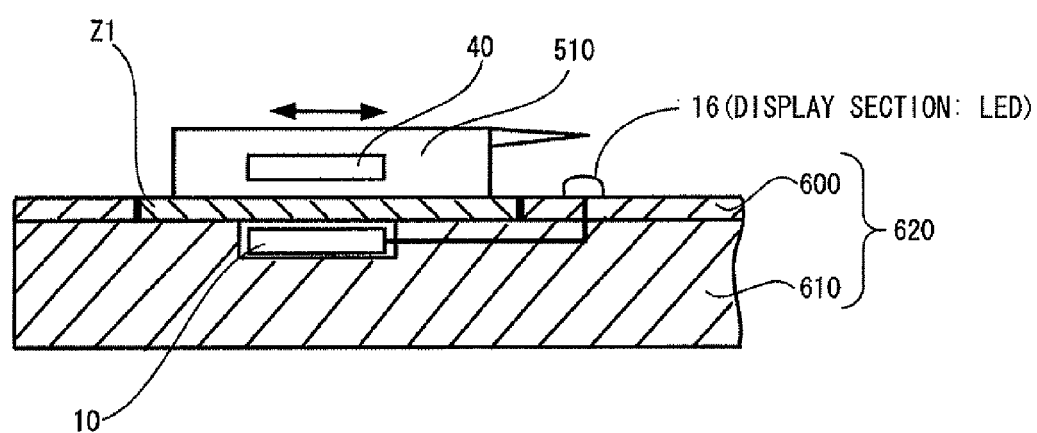

FIGS. 18A and 18B are views showing an example of an application of a non-contact power transmission system using the power transmitting device having a configuration shown in FIG. 17. FIG. 18A is a perspective view showing a system desk, and FIG. 18B is a cross-sectional view of the system desk shown in FIG. 18A along the line P-P'.

As shown in FIG. 18B, the power transmitting device 10 is provided in a structure (system desk in this example) 620 having a flat surface. Specifically, the power transmitting device 10 is provided in a depression formed in the system desk 620. A flat plate (flat member; e.g., an acrylic plate having a thickness of several millimeters) 600 is provided over (on the upper side of) the system desk 620. The flat plate 600 is supported by a support member 610.

A display section (LED) 16 is provided on the flat plate 600. The user is notified of a detection result (relative positional relationship information) for the relative positional relationship between the primary coil and the secondary coil based on the harmonic detection output using the display section (LED) 16. For example, the display section (LED) 16 emits red light when the position of the primary coil (L1) has coincided with the position of the secondary coil (L2), and is turned OFF when the position of the primary coil (L1) does not coincide with the position of the secondary coil (L2).

The flat plate 600 includes a portable terminal placement area Z1 in which a portable terminal (including a portable telephone terminal, a PDA terminal, and a portable computer terminal) is placed. As shown in FIG. 18A, the portable terminal placement area Z1 included in the flat plate 600 differs in color from the remaining area so that the user can determine that the portable terminal placement area Z1 is an area in which a portable terminal should be placed. Note that the color of the boundary area between the portable terminal placement area Z1 and the remaining area may be changed instead of changing the color of the entire portable terminal placement area Z1.

A portable terminal (secondary-side instrument) 510 includes a power receiving device 40 (including a secondary coil) that receives power transmitted from the power transmitting device 10.

When the portable terminal 510 has been placed at an approximate position in the portable terminal placement area Z1, the power transmitting device 10 provided in the system desk 620 automatically detects placement of the portable terminal 510. This allows the power transmitting device 10 to detect the relative positional relationship between the primary coil and the secondary coil based on the harmonic detection output and display the detection result.

The user manually moves the portable terminal 510, and checks whether or not the display section (LED) 16 emits light. The user stops moving the portable terminal 510 when the display section (LED) 16 has emitted light. The secondary coil (L2) is thus positioned with respect to the primary coil (L1).

As described above, the secondary coil (L2) can be positioned with respect to the primary coil (L1) by providing the display section (LED) 16 that emits light of a given color when a harmonic detection output that exceeds a given level is obtained, and manually moving the portable terminal 510 (i.e., secondary-side instrument) by trial and error to search for a position at which the display section (LED) 16 emits light.

The power transmitting device 10 then starts a given operation for power transmission. When power transmission has started, the display section (LED) 16 emits yellow light to notify the user that power transmission (charging) is performed, for example.

The user may be notified of the relative positional relationship information using the display section (LED) 16 in various ways. For example, a multi-stage notification operation may be performed corresponding to the level of the harmonic detection output as a coil relative positional relationship detection signal. For example, the display section (LED) 16 emits red light when a harmonic detection output that exceeds a first level is obtained, and emits green light when a harmonic detection output that exceeds a second level higher than the first level is obtained.

The user manually moves the portable terminal 510 (secondary-side instrument) by trial and error, and checks whether or not the display section (LED) 16 emits light and the color of the light. This makes it possible to more efficiently position the secondary coil (L2) with respect to the primary coil (L1).

Specifically, since the secondary coil (L2) has approached the primary coil (L1) to some extent when the display section (LED) 16 emits red light, the user can more carefully move the secondary-side instrument 510 (portable terminal) within a narrow search (movement) range.

According to this example, the secondary-side instrument 510 (portable terminal) can be easily positioned utilizing color display. This makes it easy to position the secondary coil (L2) with respect to the primary coil (L1).

Note that the user may be notified of placement or removal (leave) of the secondary-side instrument 510 (portable terminal) utilizing the state (e.g., ON, OFF, or the color of the light) of the display section (LED) 16.

Third Embodiment

The above embodiments have been described taking an example in which the harmonic detection circuit 25 and the secondary coil approach detection circuit (28 or CP1) function as a means for adjusting the positional relationship between the primary coil (L1) and the secondary coil (L2). These circuits also function as a means that detects (determines) whether or not an article placed in the placement area (Z1) can be a power transmission target.

Specifically, when a harmonic can be detected by the harmonic detection circuit 25, the article placed in the placement area is not a screw, a nail, or the like, but is a secondary-side instrument that can be (may be) a power transmission target. Specifically, the harmonic detection circuit 25 also has a function of a means that detects whether or not the article placed in the placement area (Z1) is an instrument that can be a power transmission target (i.e., a detector that detects whether or not the article is an appropriate secondary-side instrument).

Likewise, when the approach of the secondary coil can be detected by the secondary coil approach detection circuit (28 or CP1), the secondary-side instrument that can be a power transmission target approaches. Therefore, the approach detection circuit also has a function of a means that detects whether or not the instrument placed in the placement area (Z1) is a secondary-side instrument that includes the secondary coil and can be a power transmission target (i.e., a detector that detects whether or not the instrument is an appropriate secondary-side instrument).

According to this embodiment, the primary-side instrument can easily and independently detect whether or not the article placed in the placement area can be a power transmission target (i.e., can determine whether or not the secondary-side instrument is appropriate) (by a simple configuration utilizing the function of the non-contact power transmission).

If the primary-side instrument can independently determine whether or not the article placed in the placement area can be a power transmission target, a situation in which power is unnecessarily transmitted to an article that cannot be a power transmission target is prevented. Therefore, unnecessary power consumption and heat generation can be prevented.

In the above-described example, the primary-side instrument independently detects the secondary coil position and the like. Note that the invention is not limited thereto. For example, the secondary-side instrument may transmit an index signal to the primary-side instrument, and the primary-side instrument may receive the index signal and determine the secondary coil position.

The secondary-side instrument may transmit self-ID information, and the primary-side instrument may receive the self-ID information and determine that the secondary-side instrument is a power transmission target.

In the configuration shown in FIGS. 18A and 18B, the display section 16 (notification section) may notify the user whether or not the article placed in the placement area Z1 is an instrument that can be a power transmission target (e.g., a secondary-side instrument having a secondary-side configuration compliant with the standard), for example. For example, when the reception level of the harmonic detection circuit is appropriate, the article placed in the placement area Z1 is determined to be a secondary-side instrument that can be a power transmission target, and the display section 16 emits green light. This enables the user to determine that utilization of the non-contact power transmission system has been allowed.

Fourth Embodiment

In this embodiment, the placement area Z1 shown in FIG. 1A is formed using a transparent member (including a translucent member). The area other than the placement area may be formed using an opaque member (or a member that differs in light reflectance from the placement area).

In this case, since the user can determine the placement area Z1 and visually observe the lower side (inside) of the placement area Z1, the user can easily determine the position of a primary coil (L1) provided under (in) the placement area Z1 either directly or indirectly.

For example, the user may visually observe the primary coil (L1). Alternatively, the primary coil (L1) may be covered with an IC package or the like, and a mark that indicates the coil position may be attached to the IC package or the like. In this case, the user can determine the position of the primary coil (L1) using the mark as an index.

Therefore, when the user moves the position of the secondary-side instrument to position the primary coil (L1) and the secondary coil (L2) (second embodiment), the user can more easily position the primary coil (L1) and the secondary coil (L2) so that the convenience to the user is improved.

Although only some embodiments of the invention have been described in detail above, those skilled in the art would readily appreciate that many modifications are possible in the embodiments without materially departing from the novel teachings and advantages of the invention. Specifically, various modifications are possible without materially departing from the novel teachings and advantages of the invention.

Accordingly, such modifications are intended to be included within the scope of the invention. Any term (e.g., GND and portable telephone) cited with a different term (e.g., low-potential-side power supply and electronic instrument) having a broader meaning or the same meaning at least once in the specification and the drawings can be replaced by the different term in any place in the specification and the drawings. The coil includes a coil formed by a wire provided in a semiconductor substrate. Any combinations of the embodiments and the modifications are also included within the scope of the invention.

The configurations and the operations of the power transmission control device, the power transmitting device, the power reception control device, and the power receiving device, and the method of detecting the secondary-side load by the primary side instrument are not limited to those described in the above embodiments. Various modifications and variations may be made.

(1) According to at least one aspect of the invention, the following effects can be obtained, for example. Note that the following effects are not necessarily achieved at the same time. Accordingly, the following effects do not in any way limit the scope of the invention.

(2) The power transmitting device (primary-side instrument) can voluntarily and accurately detect the relative positional relationship between the power transmitting device (primary-side instrument) and the power receiving device (secondary-side instrument).

(3) A novel coil relative positional relationship detection method utilizing the resonance of the odd-order harmonic of the drive frequency of the primary coil is implemented.

(4) A situation in which the primary coil and the secondary coil are positioned to satisfy a given relationship (e.g., the position of the primary coil coincides with the position of the secondary coil, or the primary coil and the secondary coil are positioned at the given distance R) can be detected by adjusting the circuit parameter of the harmonic resonant circuit provided in the secondary-side instrument.

(5) The primary coil and the secondary coil can be automatically positioned by automatically scanning the primary coil using the actuator and the XY stage utilizing the position detection result based on the harmonic detection output as an index.

(6) The user can position the secondary-side instrument by moving the secondary-side instrument by trial and error using the position detection result based on the harmonic detection output as an index.

(7) Placement or removal (leave) of the secondary-side instrument in or from a given area can be detected based on the harmonic detection output.

The positioning operation can be completely automated by combining the technology that allows the primary-side instrument to automatically detect the approach of the secondary coil provided with a magnetic material and the automatic primary coil positioning technology using the actuator.

(8) Since appropriate power transmission is necessarily implemented regardless of the size, shape, design, and the like of the secondary-side instrument, the versatility of the non-contact power transmission system is significantly improved.

(9) Since the degree of freedom of the design of the secondary-side instrument is not limited, a burden is not imposed on the manufacturer of the secondary-side instrument.

(10) Since the relative positional relationship between the coils is detected by effectively utilizing the circuit configuration of the non-contact power transmission system without using a special circuit (e.g., position detection element), the configuration does not become complicated.

(11) For example, a highly versatile and convenient next-generation non-contact power transmission system can be implemented that enables the position of the primary coil to be automatically adjusted to enable charging or the like merely by placing a portable terminal or the like in a given area of a structure (e.g., desk) having a flat surface, or enables the primary coil and the secondary coil to be positioned by manually moving a portable terminal or the like.

(12) Whether or not the article placed in the placement area is a secondary-side instrument that includes the secondary coil and can be a power transmission target can be detected using the harmonic detection circuit and the secondary coil approach detection circuit, and the user can be notified of the detection result using the notification means.

The invention achieves an effect of providing a next-generation non-contact power transmission system with significantly improved versatility and convenience. Therefore, the invention is useful for a power transmission control device (power transmitting control IC), a power transmitting device (e.g., IC module), a non-contact power transmission system, a secondary coil positioning method, and the like.

What is claimed is:

1. A power transmission control device that controls a power transmitting device of a non-contact power transmission system, the non-contact power transmission system transmitting power from the power transmitting device to a power receiving device via non-contact power transmission through a primary coil and a secondary coil that are electromagnetically coupled, the power transmission control device comprising:
a power-transmitting-side control circuit that controls power transmission of the power transmitting device to the power receiving device; and
a harmonic detection circuit that detects a harmonic of a drive signal of the primary coil,
a resonant circuit being formed when the primary coil and the secondary coil are electromagnetically coupled in a state in which the primary coil and the secondary coil have a given positional relationship, the resonant circuit resonating with the harmonic of the drive signal of the primary coil;
the harmonic detection circuit detecting the harmonic of the drive signal of the primary coil that occurs due to resonance of the resonant circuit; and
the power-transmitting-side control circuit detecting that the primary coil and the secondary coil have the given positional relationship based on a detection result of the harmonic detection circuit.

2. The power transmission control device as defined in claim 1,
the resonant circuit being formed by a leakage inductance and a capacitor connected to the secondary coil when the primary coil and the secondary coil are electromagnetically coupled in a state in which a position of the primary coil coincides with a position of the secondary coil in a plan view, the resonant circuit resonating with the harmonic of the drive signal of the primary coil; and
the harmonic detection circuit operating as a position detection circuit that detects that the position of the primary coil coincides with the position of the secondary coil in the plan view.

3. The power transmission control device as defined in claim 1,
the resonant circuit being formed by a leakage inductance and a capacitor connected to the secondary coil when the primary coil and the secondary coil are electromagnetically coupled in a state in which the center of the primary coil and the center of the secondary coil are positioned at a given distance, the resonant circuit resonating with the harmonic of the drive signal of the primary coil; and
the harmonic detection circuit operating as a position detection circuit that detects that the primary coil and the secondary coil are positioned at the given distance.

4. The power transmission control device as defined in claim 1, further comprising:
an actuator control circuit that controls the operation of an actuator, the actuator moving a position of the primary coil in an XY plane,
the primary coil being moved by causing the actuator control circuit to drive the actuator using a detection output from the harmonic detection circuit as an index to position the primary coil with the secondary coil.

5. The power transmission control device as defined in claim 1, further comprising:
an approach detection circuit that detects the approach of the secondary coil based on a coil end voltage or a coil current of the primary coil.

6. The power transmission control device as defined in claim 5,
the secondary coil being a secondary coil provided with a magnetic material, and
the approach detection circuit detecting the approach of the secondary coil by detecting a decrease of the coil end voltage or the coil current when driving the primary coil at a given frequency, the decrease being caused by an increase of inductance of the primary coil with the approach of the secondary coil provided with the magnetic material.

7. The power transmission control device as defined in claim 5,
the power-transmitting-side control circuit intermittently driving the primary coil at a given frequency in order to detect the approach of the secondary coil.

8. The power transmission control device as defined in claim 1, further comprising:
a notification section that indicates a detection result of the relative positional relationship between the primary coil and the secondary coil based on a detection output from the harmonic detection circuit.

9. A power transmitting device comprising:
the power transmission control device as defined in claim 1; and
a primary coil.

10. A non-contact power transmission system comprising:
the power transmitting device as defined in claim 9; and
a power receiving device that includes a resonant circuit, the resonant circuit resonating with a harmonic of the drive signal of a primary coil.

11. A secondary coil positioning method for a non-contact power transmission system that transmits power from a power transmitting device having a primary coil to a power receiving device having a secondary coil via non-contact power transmission through the primary coil and the secondary coil that are electromagnetically coupled, a capacitor being connected to the secondary coil, and a resonant circuit that resonates with a harmonic of a drive signal of the primary coil being formed by a leakage inductance and the capacitor when the primary coil and the secondary coil are electromagnetically coupled in a state in which a position of the primary coil coincides with a position of the secondary coil in a plan view, the method comprising:

providing a harmonic detection circuit and a notification section in the power transmitting device, the harmonic detection circuit detecting the harmonic of the drive signal of the primary coil that occurs due to resonance of the resonant circuit; and the notification section indicating a detection result for the relative positional relationship between the primary coil and the secondary coil based on a detection output from the harmonic detection circuit; and moving the position of the power receiving device using notification information from the notification section as an index to position the secondary coil with respect to the primary coil.

\* \* \* \* \*